US011551251B2

(12) United States Patent
Yates

(10) Patent No.: US 11,551,251 B2
(45) Date of Patent: Jan. 10, 2023

(54) SYSTEM AND METHOD FOR TRANSACTIONAL DATA ACQUISITION, AGGREGATION, PROCESSING, AND DISSEMINATION IN COORDINATION WITH A PREFERENCE MATCHING ALGORITHM

(71) Applicant: Rodney Yates, Gretna, NE (US)

(72) Inventor: Rodney Yates, Gretna, NE (US)

( * ) Notice: Subject to any disclaimer, the term of this patent is extended or adjusted under 35 U.S.C. 154(b) by 0 days.

(21) Appl. No.: 17/525,491

(22) Filed: Nov. 12, 2021

(65) Prior Publication Data

US 2022/0180389 A1 Jun. 9, 2022

Related U.S. Application Data

(60) Provisional application No. 63/112,928, filed on Nov. 12, 2020.

(51) Int. Cl.
*G06Q 30/00* (2012.01)
*G06Q 30/02* (2012.01)
(Continued)

(52) U.S. Cl.
CPC ....... *G06Q 30/0222* (2013.01); *G06Q 20/341* (2013.01); *G06Q 20/4015* (2020.05); *G06Q 30/0234* (2013.01)

(58) Field of Classification Search
None
See application file for complete search history.

(56) References Cited

U.S. PATENT DOCUMENTS

| 6,298,330 B1 * | 10/2001 | Gardenswartz | G06Q 30/02 |
| | | | 705/14.35 |
| 7,010,497 B1 * | 3/2006 | Nyhan | G06Q 30/02 |
| | | | 707/999.102 |

(Continued)

OTHER PUBLICATIONS

Ching, Andrew, et al. "Payment Card Rewards Programs and Consumer Payment Choice." Journal of Banking and Finance 34 (2010), pp. 1773-1787. (Year: 2010).*

(Continued)

*Primary Examiner* — Luis A Brown
(74) *Attorney, Agent, or Firm* — Sandberg Phoenix & von Gontard PC

(57) ABSTRACT

A method for determining customer lifetime value for a cohort of customers using an incentive system to provide for geographically limited rewards earned for transactions includes tracking payment card transactions between enrolled payment cardholders and enrolled merchants, creating a database of rewards eligible transactions, instructing a virtual payment card issuer to apply the rewards amount for each rewards eligible transaction to an account, receiving transaction authorization requests from the virtual payment card issuer corresponding to enrolled cardholders requesting to spend rewards within their corresponding account, if the transaction is occurring within a prescribed geographic area in which rewards can be spent, transmitting an authorization for the virtual card issuer to complete the transaction using the rewards, an enrolled payment cardholder attribute database, and applying a matching algorithm to the attribute database resulting in prediction based on similarity between one or more attributes with one or more other enrolled payment cardholders.

20 Claims, 27 Drawing Sheets

(51) Int. Cl.
*G06Q 20/40* (2012.01)
*G06Q 20/34* (2012.01)

(56) References Cited

U.S. PATENT DOCUMENTS

| | | | | |
|---|---|---|---|---|
| 8,504,411 B1* | 8/2013 | Subasic | G06Q 30/0201 | 705/7.29 |
| 8,621,068 B2* | 12/2013 | Zohar | G06Q 30/02 | 709/224 |
| 9,412,102 B2* | 8/2016 | Wolf | G06Q 20/387 | |
| 9,430,773 B2* | 8/2016 | Aloni | G06Q 30/0234 | |
| 9,489,680 B2* | 11/2016 | Baker | G06Q 30/0261 | |
| 9,613,361 B2* | 4/2017 | Wolf | G06Q 30/0234 | |
| 9,990,645 B1* | 6/2018 | Emigh | G06Q 30/0226 | |
| 10,885,541 B1* | 1/2021 | Ho | G06Q 20/102 | |
| 2001/0020242 A1* | 9/2001 | Gupta | G06Q 30/02 | 715/255 |
| 2005/0234753 A1* | 10/2005 | Pinto | G06Q 10/04 | 700/44 |
| 2005/0273388 A1* | 12/2005 | Roetter | G06Q 30/0248 | 705/14.4 |
| 2006/0004633 A1* | 1/2006 | Ashbaugh | G06Q 30/02 | 705/14.73 |
| 2006/0293957 A1* | 12/2006 | Petersen | H04L 65/612 | 705/14.53 |
| 2007/0033104 A1* | 2/2007 | Collins | G06Q 30/0251 | 705/14.41 |
| 2007/0157237 A1* | 7/2007 | Cordray | H04N 21/47 | 725/89 |
| 2007/0198937 A1* | 8/2007 | Paris | G06Q 30/02 | 709/224 |
| 2007/0244741 A1* | 10/2007 | Blume | G06Q 30/0269 | 705/7.31 |
| 2008/0052140 A1* | 2/2008 | Neal | G06Q 30/0242 | 705/1.1 |
| 2008/0092162 A1* | 4/2008 | Lundy | H04N 7/163 | 725/35 |
| 2008/0103968 A1* | 5/2008 | Bies | G06Q 20/06 | 705/39 |
| 2008/0126515 A1* | 5/2008 | Chambers | G06Q 30/02 | 709/218 |
| 2008/0195609 A1* | 8/2008 | Paris | H04L 43/00 | |
| 2009/0125719 A1* | 5/2009 | Cochran | G06Q 30/02 | 713/171 |
| 2009/0247193 A1* | 10/2009 | Kalavade | H04L 67/53 | 455/456.3 |
| 2011/0161172 A1* | 6/2011 | Lee | H04L 67/025 | 709/224 |
| 2011/0167440 A1* | 7/2011 | Greenfield | H04L 63/107 | 455/411 |
| 2011/0178842 A1* | 7/2011 | Rane | G06F 16/285 | 707/E17.089 |
| 2011/0178855 A1* | 7/2011 | Rane | G06Q 30/0254 | 707/E17.089 |
| 2011/0231246 A1* | 9/2011 | Bhatia | G06Q 30/0244 | 705/14.43 |
| 2011/0246219 A1* | 10/2011 | Smith | G06Q 10/087 | 705/28 |
| 2011/0295689 A1* | 12/2011 | Brady | G06Q 30/0241 | 705/14.54 |
| 2011/0307509 A1* | 12/2011 | Hsiao | G06Q 30/0243 | 705/14.54 |
| 2012/0036013 A1* | 2/2012 | Neuhaus | G06Q 30/02 | 706/47 |
| 2012/0036178 A1* | 2/2012 | Gavini | H04L 67/02 | 709/203 |
| 2013/0006766 A1* | 1/2013 | Dedeoglu | G06Q 30/0249 | 705/14.53 |
| 2013/0013396 A1* | 1/2013 | Vinson | G06Q 30/00 | 705/14.45 |
| 2013/0080259 A1* | 3/2013 | Durvasula | G06Q 30/0246 | 705/14.66 |
| 2013/0132182 A1* | 5/2013 | Fung | G06Q 30/0232 | 705/14.23 |
| 2014/0006129 A1* | 1/2014 | Heath | G06Q 30/02 | 705/14.23 |
| 2014/0095281 A1* | 4/2014 | Weiss | G06Q 30/0207 | 705/14.13 |
| 2014/0108521 A1* | 4/2014 | Marquess | H04L 67/565 | 709/203 |
| 2014/0316873 A1* | 10/2014 | Sines | G06Q 30/0222 | 705/14.17 |
| 2015/0112826 A1* | 4/2015 | Crutchfield, Jr. | G06Q 30/0643 | 705/26.1 |
| 2015/0220957 A1* | 8/2015 | Chauhan | G06Q 30/0222 | 705/71 |
| 2015/0348083 A1* | 12/2015 | Brill | G06Q 20/386 | 705/14.23 |
| 2016/0189191 A1* | 6/2016 | Spalding | G06Q 30/0276 | 705/14.23 |
| 2017/0161714 A1* | 6/2017 | Feng | G06Q 30/363 | |
| 2017/0178174 A1* | 6/2017 | Mitchell | G06Q 30/0226 | |
| 2018/0084308 A1* | 3/2018 | Lopatecki | H04H 60/82 | |
| 2018/0197195 A1* | 7/2018 | Das | G06Q 40/02 | |
| 2019/0114666 A1* | 4/2019 | Kohli | G06Q 10/083 | |
| 2019/0147708 A1* | 5/2019 | Monaco | G06Q 20/065 | 705/16 |
| 2019/0205915 A1* | 7/2019 | Hunter | G06Q 30/0229 | |
| 2020/0202315 A1* | 6/2020 | Mohandas | G06Q 20/389 | |
| 2021/0073849 A1* | 3/2021 | Qi | H04W 4/35 | |
| 2021/0166260 A1* | 6/2021 | Ho | G06Q 30/0233 | |
| 2021/0217043 A1* | 7/2021 | Sharma | G06Q 30/0227 | |
| 2021/0398163 A1* | 12/2021 | Nelsen | G06Q 30/0229 | |
| 2022/0114570 A1* | 4/2022 | Sawant | G06Q 30/0215 | |

OTHER PUBLICATIONS

Smart Card Alliance. "The Mobile Payments and NFC Landscape: A U.S. Perspective." Sep. 2011. (Year: 2011).*

Hsieh, Nan-Chen. "An Integrated Data Mining and Behavioral Scoring Model for Analyzing Bank Customers." Expert Systems with Applications 27 (2004) pp. 623-633. (Year: 2004).*

* cited by examiner

| Attributes \ Enrolled Cardholder ID | 1234-1234-1234-1234 | 1234-1234-1234-1235 | NNNN-NNNN-NNNN-NNNN |
|---|---|---|---|
| Age (in years) | 18 | 54 | 37 |
| Sex (as a Boolean 1=male 0=female) | 1 | 1 | 0 |
| Brand A Interest Rating (1-5) | 3 | 5 | 1 |
| Brand A Interest Expression (Boolean 1=True 0=False) | 1 | 1 | 0 |
| Brand B Interest Rating (1-5) | 4 | 2 | 1 |
| Brand B Interest Expression (Boolean 1=True 0=False) | 1 | 1 | 0 |
| Time on Brand A page of Incentive Application (min.) | 30 | 60 | 0 |
| Time on Brand B page of Incentive Application (min.) | 50 | 5 | 0 |
| Visited Brand A Physical Location (Boolean) | 1 | 1 | 1 |
| Visited Brand B Physical Location (Boolean) | 1 | 1 | 1 |
| Number of Transactions With Brand A | 4 | 6 | |
| Number of Transactions With Brand B | 5 | 0 | |
| Full Transaction Matrix | [Data] | [Data] | [Data] |
| ... | ... | ... | ... |

- 1102: Age, Sex
- 1104: Brand A/B Interest Rating and Expression
- 1106: Time on Brand A/B page, Visited Brand A/B Physical Location
- 1108: Number of Transactions With Brand A/B, Full Transaction Matrix

SYSTEM AND METHOD FOR TRANSACTIONAL DATA ACQUISITION, AGGREGATION, PROCESSING, AND DISSEMINATION IN COORDINATION WITH A PREFERENCE MATCHING ALGORITHM

CROSS-REFERENCE TO RELATED APPLICATIONS

This application claims the benefit of U.S. Provisional Application No. 63/112,928, filed Nov. 12, 2021, the entirety of which is hereby incorporated by reference. This application is related to U.S. Non-Provisional application Ser. No. 17/496,575, filed Oct. 7, 2021, U.S. Non-Provisional application Ser. No. 17/484,199, filed Sep. 24, 2021, and U.S. Non-Provisional application Ser. No. 17/493,618, filed Oct. 4, 2021.

STATEMENT REGARDING FEDERALLY SPONSORED RESEARCH

Not Applicable.

BACKGROUND

The presently disclosed systems and methods relate to incentivizing repeat transactions with merchants within a prescribed geographic area using payment processing network data and using acquired transaction data to determine customer lifetime value for various cohorts.

Historically, "charge" cards or other payment cards have been used for customer transactions with merchants. The payments to merchants are initially made by the customer's bank which issued the payment card and thereby credit is provided to the customer. Over time, associations of banks and payment card issuers have grown resulting in payment networks including transaction processing companies and banks that enable cardholders to widely use charge cards or other payment cards at many merchants and regardless of the merchant's relationship or lack of relationship with the bank issuing the payment card to the customer.

Separately, merchants have an ongoing need to incentivize repeat transactions by customers. In order to incentivize repeat transactions, merchants have historically provided incentives such as coupons and rewards programs which allow customers to earn points or cash to apply towards further purchases with the same merchant. These rewards programs only allow for points/rewards to be generated through purchases from the singular merchant and are allowed to be applied to a purchase at any of the merchant's locations—regardless of geography and including the merchant's e-commerce website.

Card issuers have also implemented rewards systems separately from merchants. Typically, rewards are generated through all purchases (e.g., a "cashback" program) or purchases at all locations of specific merchants—regardless of geography. The rewards are generally in the form of cash that can be applied to the cardholder's account balance and thus are generally applicable to any purchase.

Shopping centers, malls, outlet malls, and other groupings of different merchants do not have a way of providing rewards generated from purchases at merchants within the group. Typically, shopping centers, malls, outlet malls, and other merchant groupings only act preemptively to drive sales, e.g., through the use of promotional coupons. These types of promotions are not earned through merchant transactions and do not allow for rewards to be earned amongst a variety of merchants within the mall and spent at any of the merchants within the mall.

Separately but relatedly, shopping centers or like groups and individual merchants themselves typically do not have robust information about their customers. This is primarily due to a lack of information collection (e.g., due to inability). The paucity of information prevents shopping centers or like groups from analyzing their customers using techniques such as matching and/o recommendation algorithms.

BRIEF SUMMARY

Briefly, systems and methods are disclosed herein which provide for incentivizing repeat transactions with merchants within a prescribed geographic area using payment processing network data. The disclosed systems and methods allow for groupings of merchants such as merchants within a shopping center to provide for a customer rewards system that allows earning of rewards at any of the merchants and spending of rewards at any of the merchant's physical locations within the shopping center. These systems and methods are more effective at incentivizing repeat transactions than promotional coupons and allow for rewards to be earned through purchases widely while limiting the spending of the rewards narrowly to the physical merchant locations within the shopping center (or other geographically defined area).

The system also collects transaction data from participating users in order to facilitate providing rewards and in turn incentivize repeat transactions. This transaction data is in turn used to analyze customers using, for example, matching and/or recommendation algorithms. This can include, for example, making product or brand recommendations for customers based on a matching/recommendation algorithm analysis, determining using a matching/recommendation algorithm, similarities between customers (e.g., to enable targeting of promotions, advertisements, or the like), determining potential voids in merchants or merchant categories within the geographic area using matching/recommendation algorithms and acquired customer data, and the like. Importantly, the incentivizing system provides for data acquisition that makes possible the calculation of such customer lifetime values. Without this high-quality data, the calculation of customer lifetime value (e.g., in the shopping center context) would be inaccurate or impossible. The data includes transaction data and includes other cardholder information such as demographics, brand interests, and behavior.

DESCRIPTION OF THE DRAWINGS

In the accompanying drawings which form part of the specification:

FIGS. 8A-1 through 8C-3 are portions of a single relational data model showing the data collected using various portions of the systems and methods described herein. FIGS. 8A-1 through 8A-3 show a first part (Part A) of the single relational model in three parts, 8A-1 through 8A-3 (collectively FIG. 8A).

FIGS. 8B-1 through 8B-3 show a second part (Part B) of the single relational model in three parts, 8B-1 through 8B-3 (collectively FIG. 8B). FIGS. 8C-1 through 8C-3 show a third part (Part C) of the single relational model in three parts, 8C-1 through 8C-3 (collectively FIG. 8C).

FIGS. 9-1 through 9-3 show a simplified relational data model showing the relationship between various portions of the systems and methods described herein and the data collected. Each of FIGS. 9-1, 9-2, and 9-3 show a part of the simplified relational data model (collectively FIG. 9).

FIGS. 10-1 through 10-4 show a flowchart showing steps of data acquisition throughout the use of the systems and methods described herein with respect to a user application. Each of FIGS. 10-1, 10-2, 10-3, and 10-4 show a part of the flowchart (collectively FIG. 10).

FIG. 11 is an example of an attribute database of enrolled payment cardholder attribute information acquired through the incentive management system.

In the figures, corresponding reference characters and symbols indicate corresponding parts throughout the several views of the drawings.

DETAILED DESCRIPTION

Figure 1:
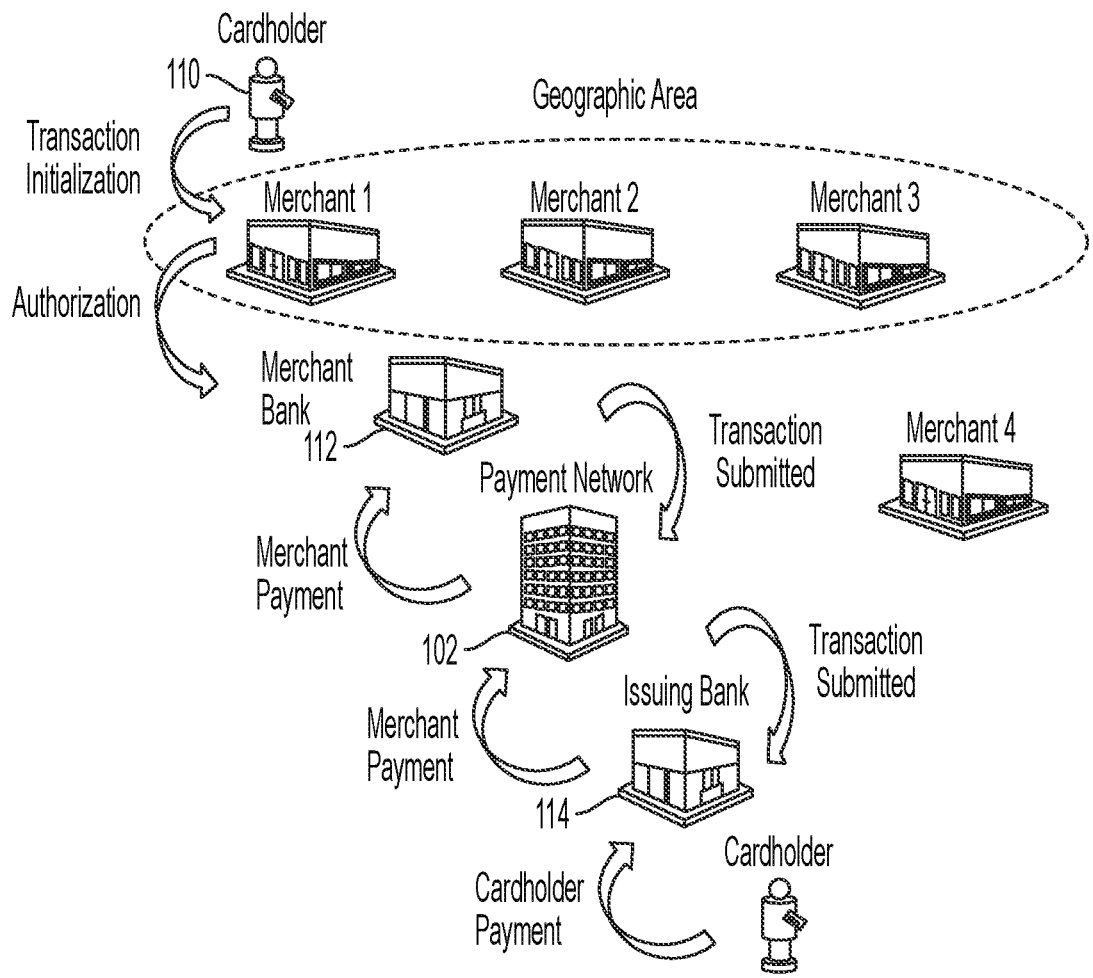
FIG. 1 is a schematic diagram illustrating an exemplary multi-party payment card system for enabling payment-by-card transactions and its relationship with different merchants in different locations.

The following detailed description illustrates systems and methods to incentivizing repeat transactions with merchants within a prescribed geographic area by way of example and not by way of limitation. The description also illustrates systems and methods to determine customer lifetime value for different cohorts related to the incentivizing system and methods described herein. The description enables one skilled in the art to make and use the incentive systems and methods, describes several embodiments, adaptations, variations, alternatives, and uses of the incentive system, including what is presently believed to be the best mode of making and using the system. Additionally, it is to be understood that the disclosed systems and methods are not limited to the details of construction and the arrangements of components set forth in the following description or illustrated in the drawings. The systems and methods disclosed are capable of other embodiments and of being practiced or being carried out in various ways. Also, it is to be understood that the phraseology and terminology used herein is for the purpose of description and should not be regarded as limiting.

Figure 12:
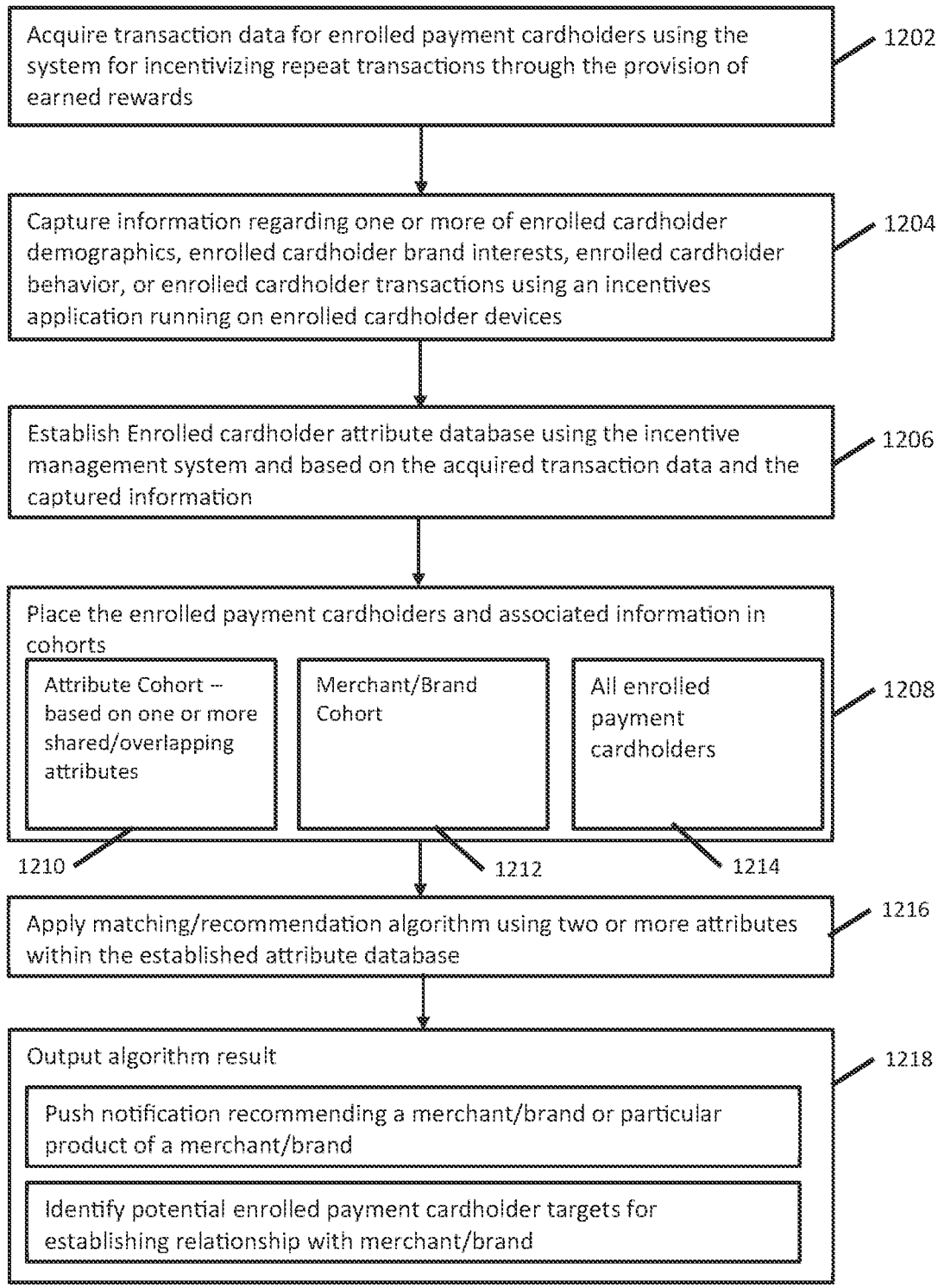
FIG. 12 is a flowchart showing steps of analyzing enrolled payment cardholder information such as enrolled payment cardholder attributes using a matching and/or recommendation algorithm.

Referring generally to FIGS. 1-12 the system and method for applying a matching algorithm/recommendation algorithm using transaction data acquired from a geographically limited rewards system is illustrated. FIGS. 1-7B and the associated description describe how the rewards portion of the system, including transaction data acquisition, operates. FIGS. 8A-10 and the associated description describe the overall system architecture and how acquired data is used in various analytical processes including, for example, calculation of customer lifetime value and providing recommendations to customers. FIGS. 11-12 and the corresponding description focus specifically on the application of a matching/recommendation algorithm using the transaction data acquired using the techniques described throughout and with respect to the systems and methods providing geographically limited rewards in response to transactions between enrolled payment cardholders and enrolled merchants.

Referring generally to FIGS. 1-7B, a system 100 and associated methods provide incentives to customers to shop in a prescribed geographic area. The system 100 is adapted and configured to interact with existing payment networks 102 to facilitate the incentivizing of repeat transactions within a geographic area. Generally, the system 100 interacts with the payment network 102 to identify transactions by customers participating in a rewards/incentives program. For example, the system 100 identifies transactions by participating cardholders (e.g., people making purchases with debit or credit cards issued by financial institutions to extend credit to or facilitate purchases by cardholders) by using transaction data related to the participating user's card received from the payment network 102 and identifying data associated with participating cardholders.

The system 100 compares identified transactions by participating cardholders with merchant identification data to determine if the identified transaction by the participating cardholder (e.g., enrolled cardholder and/or enrolled user) is eligible to generate rewards for the participating cardholder. The merchant identification data corresponds to merchants participating in the rewards program (e.g., enrolled merchants). This identifies transactions between enrolled users and enrolled merchants and flags these transactions as rewards eligible. The comparison between the transaction data retrieved from the transaction data aggregator 104 and the enrolled merchant identification data is carried out by an incentive management system 106.

The system 100 applies a rewards factor (e.g., 15%) to the transaction amount of the identified rewards eligible transactions to determine a rewards amount for each transaction occurring between enrolled users and enrolled merchants.

Rewards are calculated by the incentive management system 106. The system 100 transmits an instruction to a virtual card issuer 108 to apply the rewards amount to an account associated with the enrolled user who transacted with the enrolled merchant in the transaction that generated the rewards amount. The virtual card issuer manages the account and ties it to a virtual payment card that allows for the rewards to spent as cash provided that a transaction seeking to use rewards is authorized to proceed.

The system 100 authorizes or refuses to authorize transactions seeking to use rewards based at least in part on the geographic location in which the transaction to be authorized or denied is going to take place. This allows the system 100 to limit rewards spending to a specific geographic area, for example a shopping mall. In this way, the system 100 incentivizes repeat transactions with merchants within a limited geographic area, e.g., the shopping mall. The system 100 thereby drives traffic to physical shopping locations.

This system 100 thereby provides advantages in that repeat transactions with merchants within a specific geographic area are incentivized. The system 100 also advantageously allows earned rewards to be spent just like cash (although limited to a geographic area and/or participating merchants within the limited geographic area). This avoids the disadvantages of coupons which require that the coupons to be used in a very limited circumstance (e.g., with a specific merchant, with a specific product, with a minimum purchase, etc.) and that the coupons are unearned. In other words, traditional coupon rewards are limited in their ability to be applied and do not form a recurring relationship with merchants (specific merchants or general merchants within a geographic area).

The system 100 also provides an advantage over brand loyalty cards/rewards programs. Brand loyalty programs are more restrictive and only allow rewards to spend on further purchases with the same merchant/brand. These programs also do not typically have a geographic restriction on the spending of points. Such programs do not benefit a retail ecosystem such as a shopping mall but rather only benefit a single brand. Brand loyalty programs also do not allow for information sharing across brands or between brands/merchants and lessors (e.g., shopping mall operators). The system 100 provides for incentives for users to shop at a variety of brands with rewards earned from purchase from any participating merchant. The geographic limitation on spending of rewards and the cash-like nature allows the incentive to benefit a plurality of merchants and the geographic region.

The system 100 further provides an advantage over cashback style payment cards. Such payment cards have a disadvantage in that they allow rewards to be earned by any purchase with any merchant. This does not incentivize an ongoing relationship with a merchant or set of merchants. Although some cashback payment cards provide additional "bonus" rewards for shopping with a specific merchant or merchant category, these programs treat some merchants preferentially. The system 100 incentivizes merchant participation by not treating any participating merchant preferentially. Further, the system 100 limits rewards to rewards eligible transactions which occur between a user and an enrolled merchant. This incentivizes an ongoing relationship with the merchant which benefits the merchant more than a cashback payment card. In other words, the cashback payment card program benefits the payment card issuer by attracting further payment cardholders while the system 100 benefits merchants by incentivizing repeat purchases by users. A cashback payment card system further has a disadvantage in that the cashback can be spent anywhere and on any purchase. This does not allow for incentivizing repeat transactions within a specific geographic area. The system 100 does provide this advantage.

Referring now to FIG. 1, a payment network 102 and its relationship to geographically similar and geographically diffuse merchants is illustrated. In a traditional purchase with a payment card, a cardholder 110 presents the payment card to a merchant (e.g., merchant 1) at the merchant's point of sale device. This initializes the transaction. For example, the cardholder 110 or a merchant employee swipes the payment card such that information from the payment card is read by the merchant point of sale device. The merchant (e.g., merchant 1) seeks authorization for the transaction to proceed by transmitting an authorization request to the merchant's bank 112. The authorization request includes identification information—e.g., cardholder name, cardholder address, payment card number, payment card account number, card verification value (CVV) number, payment card expiration date, merchant name, merchant address, merchant identification (MID), terminal identification (TID), etc.—and transaction information—e.g., transaction amount, transaction time, etc.

The merchant bank 112 submits the transaction to the payment network 102 for authorization. The payment network 102 facilitates routing of the transaction authorization request such that the transaction authorization request reaches the appropriate issuing bank 114. The payment network 102 facilitates communication between merchants and payment card issuing banks. For example, the payment network 102 can be a network such as Visa, MasterCard, Discover, American Express, etc. The transaction authorization request is a digital message containing transaction information such as a payment cardholder identification, a merchant identification, a transaction amount, an authorization flag Boolean that can be set to true or false depending on whether the transaction has been authorized, a date/time of the transaction, an issuing bank identification or the like, and the digital message is formatted to be transmitted and handled using the systems and processes of the payment network 102 and the entities interacting with one another through the payment network 102.

The issuing bank 114 determines if the transaction authorization request should be approved or denied. For example, the issuing bank 114 can, as part of this determination, query the account of the cardholder 110 to determine if there is sufficient funds or credit for the transaction amount of the transaction for which authorization is sought, make a determination as to the probability of fraud, etc. This involves comparing information found within the received transaction authorization request to information contained within the issuing bank's database with respect to the payment cardholder identified in the transaction authorization request. For example, the issuing bank's computer systems can read the transaction amount from the authorization request and compare this to a balance held in the database records to ensure that adequate funds are present. In response to determining that the transaction is authorized, the issuing bank 114 will forward a payment, from the cardholder's account or with credit and charge the cardholder's account, to the payment network 102 such that the payment network 102 can route the payment to the merchant (e.g., merchant 1). The payment network 102, upon receipt of the payment from the issuing bank 114, forwards the payment to the merchant's bank 112 such that the transaction is settled. The payment is transmitted as a digital message formatted to be handled by the payment network 102 and associated components/actors. For example, the digital message in this case can include an amount equal to that of the transaction amount, a merchant bank identification, a merchant account identification, an instruction to credit the identified merchant account with the amount, or the like. Upon transmitting such a payment instruction, the issuing bank can debit the account of the payment cardholder identified in the transaction authorization request message.

If the issuing bank 114 determines that the transaction of the authorization request is not authorized (e.g., due to lack of funds, suspected fraud, etc.), then the issuing bank 114 transmits to the payment network 102 a refusal to authorize the transaction. The payment network 102 forwards the refusal to authorize to the merchant's bank 112. The merchant's bank 112 then forwards the refusal to the merchant (e.g., merchant 1's point of sale device). The refusal takes the form of a digital message of the type generally described herein and throughout. The message includes, for example, information identifying the transaction that has been refused authorization (e.g., transaction identification number, merchant identification, cardholder identification), an indication that the transaction authorization request has been refused (e.g., a Boolean flag set to false), text providing an explanation for the refusal (e.g., insufficient funds), or the like.

The payment network 102 similarly handles transactions between a plurality of payment cardholders and a plurality of merchants (e.g., merchant 2, merchant 3, merchant 4, etc.). The payment network 102 is adapted and configured to handle payment card transactions generally and regardless of the geography of merchants and any association of merchants. For example, if merchants 1-3 are in a shopping mall and merchant 4 is remote, the payment network 102 handles transaction involving all four merchants identically. Therefore, the payment network 102, alone, cannot differentiate based on geography for the purposes of the providing a rewards program with geographical restricted redemption of the type described herein with respect to system 100. However, the payment network 102 can be used, in addition to other systems and components, by the system 100 in order to facilitate the functions of the payment network 102 described herein.

Figure 2:
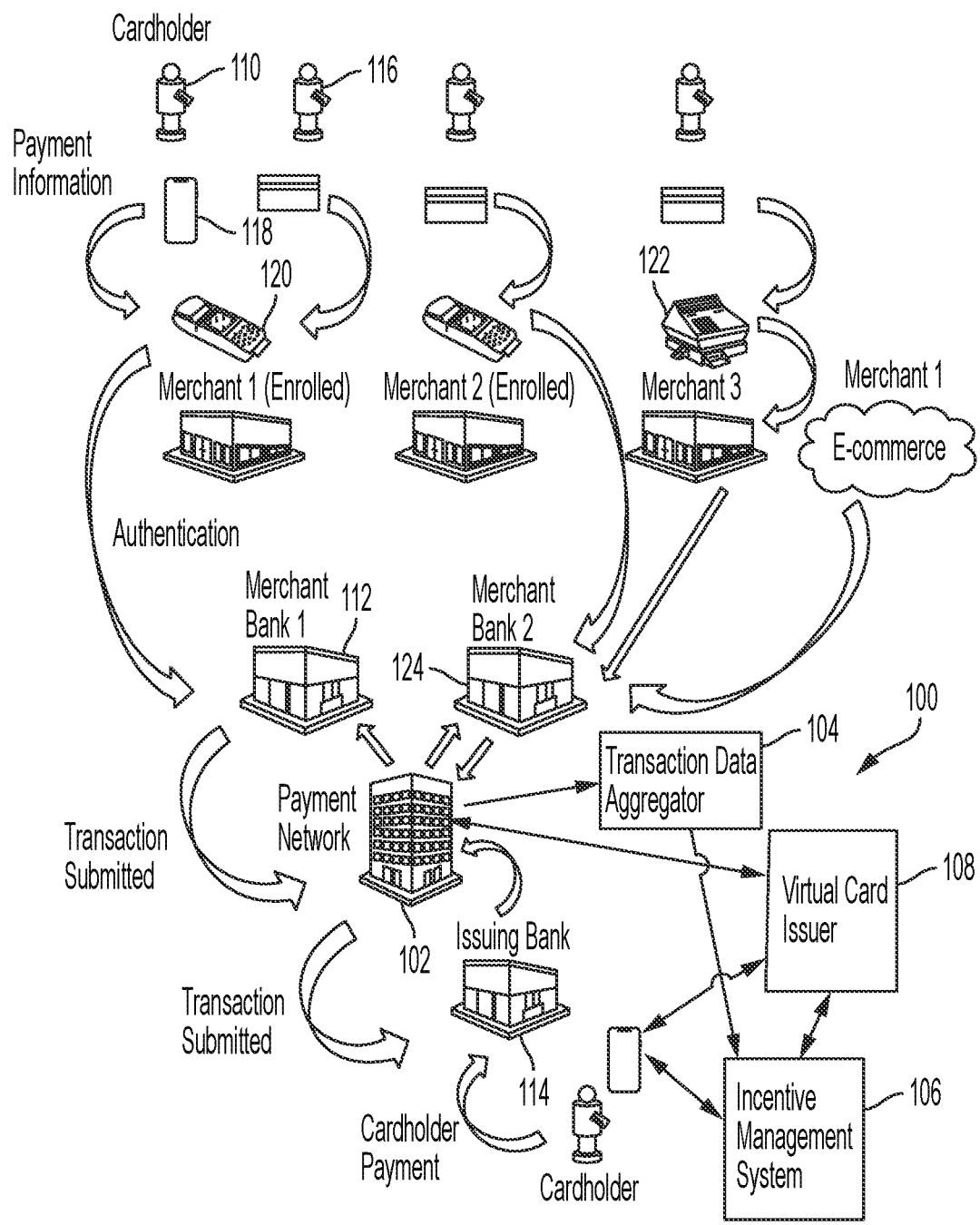
FIG. 2 is a schematic diagram illustrating the relationship between a multi-party payment card system and systems that enable the incentivizing of repeat transactions with merchants within a prescribed geographic area using payment processing network data.

Referring now to FIG. 2, system 100 and its relationship to cardholders, merchants, the payment network 102, and others is illustrated according to one embodiment. Generally, for a cardholder 110 who is enrolled with the incentive management system 106, the system 100 operates as follows. Enrollment, specifically, is described herein later and with respect to FIGS. 4A-4B. Cardholder 110 earns rewards by making purchases with a payment card at enrolled merchants, in this example merchants 1 and 2. Enrollment of merchants is described with greater detail herein later and with respect to FIGS. 5A-5B. The process of cardholder 110 making a purchase with a payment card operates as previously described with respect to any general transaction. The payment network 102 handles the transaction by moving transaction data between merchant 1, the merchant bank 112, and the issuing bank 114 (e.g., the bank issuing cardholder's 110 payment card).

Transaction data associated with the transaction is captured by the transaction data aggregator 104 which is in communication with the payment network 102. Acquisition of the transaction data can occur in a variety of ways. In one embodiment, the transaction data aggregator 104 captures transaction data for all transactions handled by the payment network 102 (e.g., as transaction authorization requests and settlements are transmitted through the payment network 102, the transaction data aggregator 104 temporarily receives the associated messages or copies of the associated messages and writes the embedded information to a database operated by the transaction data aggregator). In an alternative embodiment, the transaction data aggregator 104 monitors all transactions but captures and stores transaction data only for enrolled cardholders (e.g., cardholder 110). For example, the transaction data aggregator can maintain a database of cardholder identification data for enrolled cardholders 110 and query each transaction monitored (e.g., each message or a copy of each message handled by the payment network 102) to determine if the queried transaction includes cardholder identification data that matches cardholder identification data stored in the database of enrolled cardholders. In a further alternative, the transaction data aggregator periodically (e.g., daily, hourly, every minute, etc.) queries the payment network 102, which maintains a database of transactions (containing the information embedded in messages), for transactions which include cardholder identification data matching cardholder identification data stored in the database of enrolled cardholders by the transaction data aggregator 104. In response, the transaction data aggregator receives all transactions from the payment network 102 which include cardholder identification matching that of enrolled cardholders.

Preferably, the cardholder identification data used to track enrolled cardholders 110/users and used to identify transactions made by the enrolled cardholders 110 is an account number or payment card number corresponding to a payment card held by the enrolled cardholder 110. In other embodiments, the cardholder identification data can be one or more of a cardholder name, cardholder address, or other identifying information.

The transaction data aggregator 104 identifies and retrieves these transactions based on an instruction received from the incentive management system 106 (e.g., the instruction being a digital message including an executable request for database elements related to a transaction identification, payment cardholder identification, merchant identification, or the like). For example, the incentive management system 106 transmits a request for transaction data associated with at least one enrolled user. In response to the request, the transaction data aggregator 104 acquires and returns the relevant transactions (e.g., by executing program instructions contained with request digital message identifying the database record by a merchant/payment cardholder identification and requesting associated database entries to be read from the database and returned). In some embodiments, the incentive management system 106 does not communicate directly with the payment network 102. This has the advantage of allowing the transaction data aggregator 104 and the incentive management system 106 to operate in parallel.

Once the incentive management system 106 receives transactions involving the enrolled cardholder 110, the incentive management system 106 identifies transactions that are eligible for rewards. To identify rewards eligible transactions, the incentive management system 106 checks each received transaction by an enrolled cardholder 110 to determine if the transaction was with an enrolled merchant (e.g., this check is performed by querying a database of the received transactions using a database or matrix of merchant identifications and selecting, flagging, copying, or the like the database entries with enrolled merchant identifications). For example, the incentive management system 106 identifies merchant identification data in the transaction known to involve an enrolled cardholder 110. The identified merchant identification data is compared (e.g., using database comparison techniques) to a database of merchant identification data for enrolled merchants. If there is a match, the transaction being analyzed is flagged as rewards eligible. If the merchant identification data found in the transaction is not found in the database of enrolled merchants, then the incentive management system 106 determines that the transaction is not rewards eligible. Transactions that are rewards eligible can be put into a database of rewards eligible transactions or can be handled on an individual basis as they are identified (e.g., database entries that are identified as including enrolled merchant identifications are copied to extract all related database entries and the entries are written to a new database such as the database of rewards eligible transactions).

The incentive management system 106, in conjunction with the transaction data aggregator 104, captures transactions with an enrolled merchants e-commerce website in the same manner and evaluates if the transactions are rewards eligible in the same manner. This allows for the incentive management system 106 to provide rewards made for online purchases between enrolled cardholders and enrolled merchants.

In some embodiments, the incentive management system 106 utilizes affiliate links or uniform resource locators (URL) to capture transactions between enrolled cardholders and enrolled merchant e-commerce websites instead of using the transaction data aggregator 104 as previously explained with respect to other embodiments. In these embodiments, the enrolled payment cardholders unique enrolled cardholder devices 118 each include an application that allows for online shopping. Each application includes unique affiliate links with unique URLs linking to e-commerce sites of enrolled merchants. For example, each URL includes or is otherwise associated with identification information for each unique enrolled cardholder (e.g., includes a user identification number or code). This allows enrolled merchant e-commerce sites to uniquely identify each enrolled cardholder who navigates to their e-commerce site from the incentive application on the enrolled cardholder's device 118. Enrolled merchants or an affiliate network handling such linking can then track purchases made by enrolled cardholders who are linked to e-commerce cites by unique URLs. The purchase information and/or transaction information is then provided to the incentive management system 106 by the enrolled merchant or the affiliate network and is tied to the unique URL that was used to navigate to the e-commerce site where the purchase was made. The URL is linked to the enrolled cardholder by using a database associating the two maintained by the incentive management system 106 or by enrolled cardholder identification information included in the unique URL. The purchase information and/or transaction information includes at least a transaction amount allowing for the incentive management system 106 to calculate and assign earned rewards from the purchase. The purchase information and/or transaction information can also include further details of the purchase as described herein with respect to transaction information and/or additional specific information. Such additional specific information can include stock keeping unit (SKU) information identifying the products purchased or other information detailing the product purchased. Such information can be used by the incentive management system 106 in making recommendations as described herein based on specific product purchases by enrolled cardholders placed in the same cohort as explained herein.

Using the rewards eligible transactions identified by the incentive management system 106, the incentive management system 106 calculates a rewards amount. To do this, the incentive management system 106 identifies a transaction amount in the transaction data associated with the rewards eligible transaction (e.g., by querying the database of rewards eligible transactions for each entry to identify the amount element of the entry). Using the transaction amount, the incentive management system 106 applies a rewards factor to determine the rewards amount. For example, the rewards factor can be between 0.1 and 0.2, inclusive, and can be more preferably 0.15. It has been found that 0.15 is an optimum rewards rate to increase participating by both cardholders and merchants. The determined rewards amount is either used as it is calculated or placed in or added to a database that includes the associated enrolled cardholder identification data. Again, these steps can be performed on a transaction by transaction basis as rewards eligible transactions are identified as described above or can be handled in a batch process if the identified rewards eligible transactions are placed into a database of rewards eligible transactions.

After determining an awards amount for a transaction or a set of transactions (the amounts placed in a database), the incentive management system 106 prepares an instruction and sends the instruction to the virtual card issuer 108 to apply the rewards amount to an account for the enrolled cardholder who participated in the transaction for which rewards were calculated. The instruction is a digital message including the rewards amount and identifying the associated enrolled payment cardholder/account to be credited, and includes a program instruction to be executed by the virtual card issuer to credit the account. The instruction includes cardholder identification information and the rewards amount such that the virtual card issuer 108 can increase an account balance of the enrolled cardholder by the rewards amount. The account maintained by the virtual card issuer 108 corresponds to a virtual payment card usable by the enrolled cardholder. Again, the balances can be updated serially or in a batch process.

For transactions involving non-enrolled cardholders (e.g., cardholder 116), the transaction data aggregator 104 does not capture these transactions, even if the transaction involves an enrolled merchant.

It should be understood that the identification of rewards eligible transactions between enrolled merchants and enrolled cardholders 110 can be identified using any suitable order of steps or techniques. For example, in an alternative embodiment, the same steps are performed but in reverse order. The transaction data aggregator 104 identifies transactions involving enrolled merchants by interacting with the payment network 102 in the manner described above with respect to the enrolled cardholder identification data (e.g., querying the payment network 102 to identify transaction including enrolled merchant identification data such as a merchant identification, terminal identification, merchant name, or the like. Those transactions received from the payment network by the transaction data aggregator 104 and forwarded to the incentive management system 106 are then compared against a database of enrolled cardholders 110 to identify transactions between the two enrolled parties. This is done in the same manner described above with respect to comparing the received transaction to the database of enrolled merchants (e.g., the comparison executed using database querying/comparison techniques of the type described herein). For transactions involving merchants not enrolled (e.g., merchant 3), the transaction is not captured by the transaction data aggregator even if the transaction is between the non-enrolled merchant (e.g., merchant 3) and an enrolled cardholder.

It should further be understood that the operations described above can be carried out using databases or any other suitable data structure and/or data processing technique.

Earning rewards and processes performed by the system 100 are described later herein with additional detail and with respect to FIGS. 6A-6B.

Still referring to FIG. 2, an enrolled cardholder 110 can spend accumulated rewards using a virtual payment card issued and maintained by the virtual card issuer 108. The account is established by the virtual card issuer 108 in response to an instruction from the incentive management system 106 when the incentive management system 106 enrolls a cardholder 110. In some embodiments, the instruction is a digital message including cardholder identification information and an executable programming instruction that is formatted to cause the virtual card issuer 108 to execute the programming instruction according to its own program and establish the account. The virtual payment card is held within a virtual wallet and/or application running on the enrolled cardholder's device 118 (e.g., a smartphone). The application can be downloaded by the cardholder 110 as a portion of the enrollment process. For example, and without limitation, the enrollment can be requested through the application with the application communicating with the incentive management system 106.

When making a purchase with rewards, the enrolled cardholder 110 presents the virtual payment card at the merchant's point of sale device 120. In the case where the merchant is not an enrolled merchant (e.g., merchant 3), the non-enrolled merchant's point of sale device 122 transmits a transaction authorization request through the merchant bank 124 (e.g., merchant bank 2) and payment network 102 to the issuer of the virtual payment—the virtual card issuer 108. In this manner, the transaction is handled like any typical payment card transaction. Upon receiving the transaction authorization request (which is, for example a digital message routed by the payment network 102), the virtual card issuer 108 forwards the request to the incentive management system 106 for processing. The virtual card issuer 108 can forward the transactions authorization request to the inventive management system 106 as a digital message including the information of the transaction authorization request using any suitable technique (e.g., message routing, use of an API, memory sharing, packet forwarding, or the like). In alternative embodiments, the virtual card issuer 108 performs the transaction authorization functions described herein as performed by the incentive management system 106.

When the incentive management system 106 receives the transaction authorization request, the incentive management system 106 first determines if the transaction that is the subject of the authorization request is with an enrolled merchant. For example, the incentive managements system 106 retrieves from the authorization request a merchant identification and compares the merchant identification to a database of enrolled merchant identifications. If the merchant identification of the transaction authorization request is not found in the database of enrolled merchants then the incentive management system 106 does not authorize the transaction. The refusal is transmitted to the virtual card issuer 108 which then communicates the refusal to authorize back through the payment network 102 and to the merchant point of sale device 122.

Moving to a second scenario, if the enrolled cardholder 110 is transacting with an enrolled merchant, the incentive management system 106 determines that the merchant identification of the transaction authorization request matches a merchant identification of an enrolled merchant held within a database of enrolled merchant identification information. This determinization can be made, for example, by querying the database of enrolled merchant identification with the merchant identification read from the transaction authorization request and if a match is found in an existing record returning an indication that such a match is found. These operations are carried out using suitable database instructions and arguments of the type described herein and known in the art. The indication can be an instruction, flag, conditional statement input, or the like and allows a program of the incentive management system 106 to further execute the steps/methods/functions described herein.

The incentive management system 106 also controls authorizations of transaction requests involving the virtual payment card in order to restrict spending of rewards, by the virtual payment card, to a specific geographic area. In one embodiment, this is achieved by controlling the enrollment of merchants such that only merchants within the specific geographic area are enrolled. For example, a merchant enrollment system of the type described herein can receive merchant location information (e.g., census tract, address, global positioning system coordinates, or the like) input digitally through a web portal and can compare the merchant location information to location information defining the geographic area in which rewards may be spent (e.g., compare using database querying/comparing techniques of the type described herein the received merchant address or component thereof to a listing of addresses or components thereof that fall within the geographic area).

In embodiments where merchant enrollment is controlled, once a match is found between the merchant identification of the transaction authorization request and a merchant identification in the database of enrolled merchants, the incentive management system 106 causes the transaction to be authorized. The transaction necessarily being within the specific geographic area. The incentive management system 106 causes the transaction to be authorized by transmitting an instruction (e.g., digital message with program executable instructions) to the virtual card issuer 108 to transmit an authorization through the payment network 102 and the merchant bank 112 (e.g., merchant bank 1) and to the merchant point of sale device 120. In some embodiments, the instruction is a digital message formatted (e.g., using an API) to be read by systems of the payment network 102 and includes delineated message elements such as a destination address (e.g., merchant bank identification, merchant identification, or the like), a sending address (e.g., virtual card issuer identification), transaction amount, authorization information (e.g., a flag or Boolean set to indicate that the transaction is authorized), additional transaction information, or the like.

In an alternative embodiment, the incentive management system 106 determines if the transaction of the transaction authorization request is occurring within the prescribed geographic area based on a portion of a merchant address included within the transaction authorization request. The incentive management system 106 compares a portion of a merchant address included within the transaction authorization request to a portion of an address defining the geographic area within which rewards can be spent. The portion of the address defining the geographic area is predefined and stored within the incentive management system 106. For example, the portion of the address at issue can be a street name, a zip code, a county, a city, a census tract, or a state. This comparison is carried out in some embodiments, by the incentive management system 106 reading the transaction authorization request digital message and extracting an element of the message that includes the address of the merchant. The database of enrolled merchants is queried using the extracted address element (e.g., using a suitable database command of the type described herein) and if a match is found with an existing database entry element, then the program executed by the incentive management system 106 proceeds to format and transmit an instruction authorizing the transaction of the type described herein.

In a further alternative embodiment, the incentive management system interacts with the enrolled cardholder's device 118 and the application running on the device to acquire position data that is used to determine if the transaction that is the subject of the authorization request is occurring within the prescribed geographic area. In response to receiving the transaction authorization request, the incentive management system 106 transmits a request to an enrolled payment cardholder device 118 for global positioning system data. The request is formatted to cause the application running on the enrolled payment cardholder device 118 to retrieve global positioning system data and transmit the global positioning system data to the incentive management system 106. In one embodiment, the request is a digital message communicated through the internet and an application API and includes in its payload an instruction formatted to be executed by the application on the device 118 that causes the device to acquire GPS coordinates and transmit a return message including in its payload the acquired GPS coordinates. The messages also include other relevant information/elements such as a sender address, recipient address, message identifier, executable instructions, and the like.

The incentive management system 106 receives, from the enrolled payment cardholder device 118, global positioning system data and associates that global positioning system data with the transaction authorization request. In some embodiments, the global positioning system data is received via return message through the internet of the type described above. The incentive management system 106 compares the global positioning system data associated with the transaction authorization request to a geofence boundary defining the prescribed geographic area in which rewards can be spent at enrolled merchants. The incentive management system 106 further determines that the transaction of the transaction authorization request occurred within the prescribed geographic area when the global positioning system data associated with the transaction authorization request corresponds to a location within the geofence boundary. For example, in one embodiment, the incentive management system extracts from the received message the global positioning system data in the form of longitude and latitude coordinates. The incentive management system then compares the received longitude and received latitude to a predetermined range(s) of longitude and latitude (e.g., upper and lower bounds) that define the geographic area. If the received values are between the upper and lower bounds then the incentive management system 106 has determined that the transaction is occurring within the prescribed geographic area and can proceed with authorizing the transaction as described herein.

Regarding redemption of rewards, it should be understood that in some embodiments, a transaction will be authorized that allows for partial payment with rewards via the virtual payment card. If the balance in the account of the virtual payment card does not exceed the transaction amount, the transaction can be reformatted to apply the entire rewards balance with the remainder being paid by the enrolled cardholder through a separate transaction (e.g., using cash or another payment card).

Regardless of the process used to determine if the transaction of the transaction authorization request is occurring within the prescribed geographic area, the prescribed geographic area can be or correspond to a shopping mall, outlet mall, community improvement district, tax increment financing district, or commercial district. The geographic location can also correspond to a single retailer, the single retailer offering a plurality of differently branded products for sale. In such a case and/or in other cases, the merchant is a seller of a specific brand of product. For example, the merchant can be a department store, grocery store, restaurant, clothing retailer, accessory retailer, pharmacy, technology retailer, pet retailer, toy retailer, general merchandise retailer, or service provider.

Figure 3:
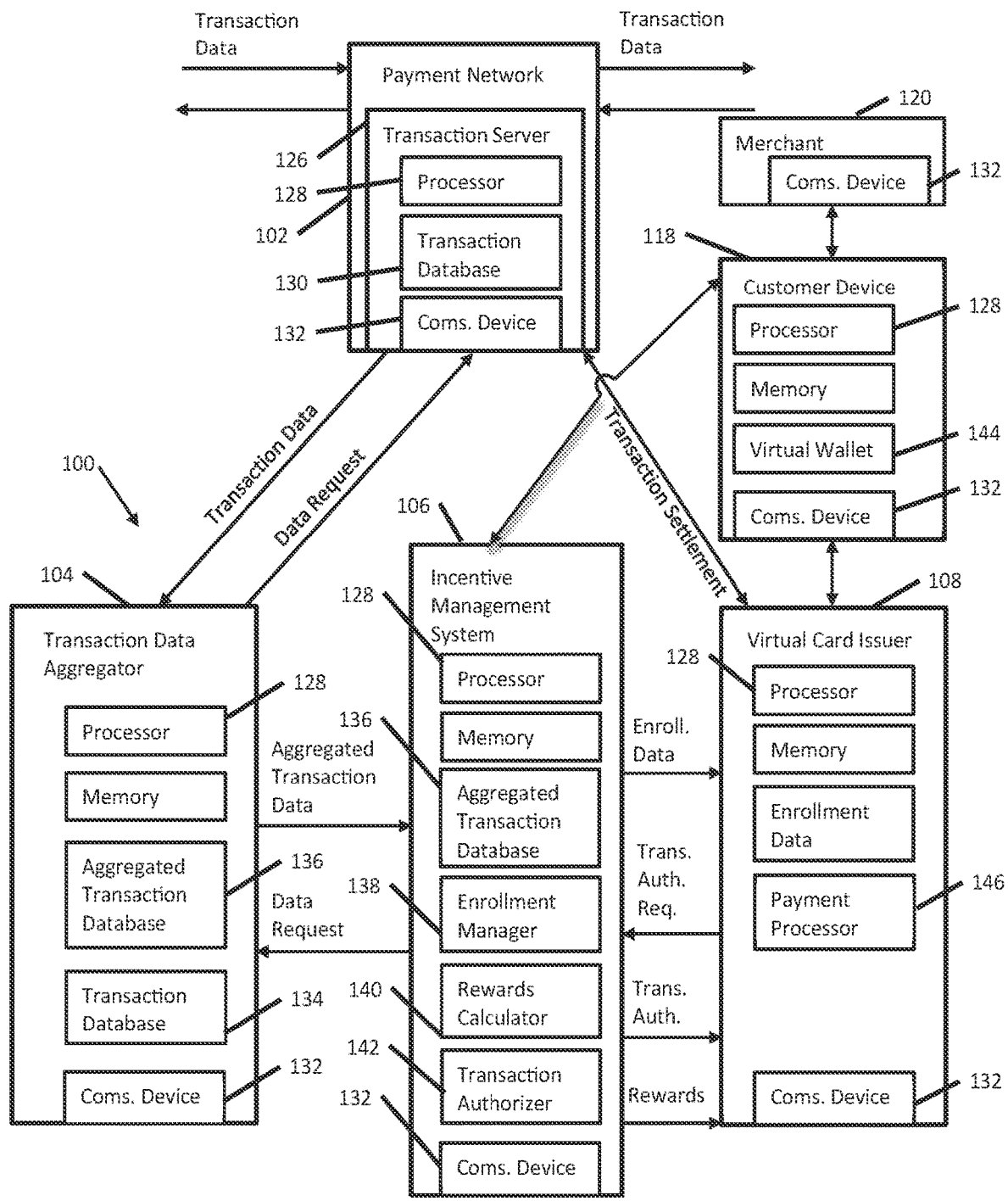
FIG. 3 is a simplified block diagram illustrating the relationship between the multi-party payment system network, a transaction data aggregator, incentive management system, virtual card issuer, customer device, and merchant that enable the incentivizing of repeat transactions by customers at specific merchants.

Referring now to FIG. 3, the system 100 is shown in greater detail in relationship to the payment network 102. The payment network 102 (e.g., payment processor, payment processing network, etc.) handles transaction data for transaction authorizations and transaction settlements of the type and in the manner described herein. To process authorizations and transaction, the payment network 102 includes at least one transaction server 126. In some cases, the payment network 102 includes a plurality of transaction servers 126 that can be geographically dislocated. Each transaction server 126 includes a processor 128, a transaction database 130, and a communications device 132. These components, along with other components not shown (e.g., memory, a power source, etc.), carry out the functions of the payment network and transaction server described herein. The processor 128 can be a special purpose or a general purpose processor device. As will be appreciated by persons skilled in the relevant art, processor 128 can also be a single processor in a multi-core/multiprocessor system, such system operating alone, or in a cluster of computing devices operating in a cluster or server farm. Processor device 128 is connected to the communications device 132 and the transaction database 130 with, for example, a bus, message queue, network, or multi-core message-passing scheme. The transaction server 126 can further include memory to which one or more other components are connected for communication. For example, the transaction server 126 can include random access memory (RAM), a hard disk drive, removable storage drive, a floppy disk drive, a magnetic tape drive, an optical disk drive, a flash memory, or the like. Programs that facilitate the functions described herein can be stored in memory and executed by the processor 128.

The transaction database 130 is stored in memory of the transaction server 126 or a similar component within the payment network 102. The transaction database 130 stores transaction information for a plurality of transactions and can store the transaction transitorily, for a period of time, or permanently. Transaction information can include any of the information described herein and or other information. For example, and without limitation, transaction information can include cardholder identification information (e.g., name, address, telephone number, payment card number, etc.), an account number corresponding to the payment card, a card verification value, a payment card expiration date, merchant identification information (e.g., merchant identification number, name, address, telephone number, etc.), a terminal identification number corresponding to a point of sale device, transaction amount, the product being purchased (e.g., a stock keeping unit code), the date, the time, the location (e.g., merchant address), and or other transaction information.

The communications device 132 is in communication internally with the processor 128, transaction database 130, memory, and/or other components of the transaction server 126. The communications device 132 allows for communication with external devices (e.g., merchant bank servers, issuing bank servers, merchant point of sale devices, the transaction data aggregator 104, the incentive management system 106, virtual card issuer 108, etc.). The communications device 132 can be or include a modem, a network interface (such as an Ethernet card), a communications port, a PCMCIA slot and card, or the like. Information communicated through the communications device 132 can be in the form of signals, which can be electronic, electromagnetic, optical, or other signals capable of being transmitted/received by a communications device.

The transaction data aggregator 104 likewise includes a processor 128, memory, and communications device 132 of the type previously described with respect to the transaction server 126. The transaction data aggregator 104 also includes a transaction database 134 that includes all or a subset of the transaction stored in the transaction database 130 of the transaction server 126. Additionally, or alternatively, the transaction data aggregator 104 can include an aggregator transaction database 136. In one embodiment, the transaction data aggregator sends a data request to the payment network, using the associated communications devices 132, with the data request requesting all transaction data. For example, the data request can be a message formatted to be handled by the payment network using an application programming interface or the like and include a data request element, request target element, information return destination element, or other like information that indicates what the request is, how to handle the request, and to where and/or in what format to return data that is the subject of the request. In such an embodiment, the transaction data is then stored, at least temporarily, in the transaction database 134. For example, the payment network 102 upon receipt of the data request executes the request using the elements of the request and transmits the requested information to the transaction data aggregator 104, with the transaction aggregator writing the received transaction data to the transaction database 134 as it is received. The transactions can be narrowed to create the aggregated transaction database 134 such that the aggregated transaction database 134 includes only those transactions involving enrolled cardholders (or in alternative embodiments enrolled merchants).

In an alternative embodiment, the data request requests transaction data involving only enrolled cardholders (or in alternative embodiments enrolled merchants) and the payment network 102 parses the request. In such a case the returned transaction data is stored directly in the aggregated transaction database 134. The data request in such cases includes cardholder (or in alternative embodiments merchant) identification information such that the relevant transactions can be identified. Such information typically includes at least an identification number (e.g., payment card number, merchant identification number, etc.) but can include any of the identification information described herein.

The transaction data aggregator 104 is adapted and configured to receive (e.g., via the communications device 132) a data request from the incentive management system 106. The data request is for transactions made by enrolled payment cardholders 110 (or in alternative embodiments transaction made by enrolled merchants). The data request includes enrolled payment cardholder (e.g., enrolled user/enrolled customer) identification data of the type described herein (e.g., payment card number). The incentive management system 106 receives, in response to the data request, aggregated transaction data from the transaction data aggregator 104. The received transaction data is added to an aggregated transaction database 134 stored in the incentive management system 106. The incentive management system 106 queries the aggregated transaction database 134 with enrolled merchant identifications stored in an enrolment manager 138. This identifies rewards eligible transactions that have occurred between enrolled payment cardholders and enrolled merchants. In other embodiments and as previously described, the procedure can be reversed in that the incentive management system 106 receives transactions with enrolled merchant identification data from the transaction data aggregator 104 and cross checks the transactions with enrolled cardholder identification data stored in the enrollment manager 138 to identify rewards eligible transactions.

The enrollment manager communicates with at least a customer device 118 to enroll customers/payment cardholders. The enrollment manager also includes identification information corresponding to enrolled merchants.

Once rewards eligible transactions are identified, the incentive management system 106 calculates rewards for each rewards eligible transaction using a rewards calculator 140. The rewards calculator 140 calculates rewards for each eligible transaction using the methods described herein. For example, the rewards calculator 140 is a program, function, sub-routine, or the like and applies a rewards factor to the transaction amount for each rewards eligible transaction held in a database of such transactions. The rewards amount is appended as an additional datum for each transaction held within the rewards eligible transaction database. Alternatively, a new database is created that includes at least the rewards amount and enrolled payment cardholder identification information.

The incentive management system 106 communicates earned rewards to the virtual card issuer 108 so that the virtual card issuer can update an account balance associated with the account of the enrolled payment cardholder. This is communicated to the virtual card issuer 108 by an instruction sent from the incentive management system. The instruction causes the account of the enrolled payment cardholder to be credited by the rewards amount. The instruction includes enrollment data such as enrolled cardholder identification information. This information is used by the virtual card issuer to setup and identify accounts for virtual payment cards associated with individual enrolled payment cardholders (e.g., users).

The incentive management system 106 also communicates the earned rewards to the enrolled customer device 118 to cause an application running thereon to reflect the updated account balance. The communication causes the application to update account balances associated with the virtual payment card held within the customer device's 118 virtual wallet 144. This interaction can take the form a push notification sent by the incentive management system 106 to the enrolled payment cardholder device 118 such that an application handles the push notification and updates the account balance visible within the application/virtual wallet 144. In alternative embodiments, this is handled by the virtual card issuer 108 when it receives the instruction to update the balance.

The incentive management system 106 can also communicate directly with an enrolled payment cardholder's device 118 (e.g., customer device) to update an account balance within a virtual wallet 144, inform the enrolled payment cardholder that rewards have been earned, or send or request other information. For example, the incentive management system 106 can request cardholder identification information as part of an enrollment process. In some embodiments, the incentive management system 106 also interacts with the customer device as relates to gathering information about the payment cardholder and presenting offers/promotions, or the like. For example, the incentive management system 106 requests inputs for a matching algorithm/prediction algorithm to associate an enrolled payment cardholder with potential/likely purchases that the enrolled payment cardholder can make if informed of them. Such inputs can include demographic information (e.g., age, race, gender, sex, marital status, height, weight, shoe size, annual income, address, etc.), brand interest/preference information (e.g., brands of interest, previously purchased brands, etc.), category interest/preference information (e.g., interest in different types of products, interest in price point of products, etc.), and other information.

When transactions using rewards are initiated by an enrolled payment cardholder, the transaction authorization request is initially communicated to the virtual card issuer 108. The virtual card issuer 108 transmits the transaction authorization request to the incentive management system 106 which handles the transaction authorization request using a transaction authorizer 142. The transaction authorizer 142 is a program, function, sub-routine, or the like and determines whether to authorize the transaction that is the subject of the transaction authorization request (e.g., by determining if the transaction is with an enrolled merchant and is occurring within a prescribed geographic area). The incentive management system 106 transmits the transaction authorization or refusal to authorize to the virtual card issuer 108.

The incentive management system 106 does not communicate directly with the payment network 102 including the transaction server 126. As previously explained, this provides several advantages including allowing the components of the system 100 to operate in parallel thus increasing efficiency.

The virtual card issuer 108 communicates with the incentive management system 106 to get transaction authorization requests authorized or denied. The virtual card issuer 108 also communicates with the incentive management system 106 to receive enrollment data corresponding to enrolled payment cardholders. This allows for the virtual card issuer 108 to establish (i.e., issue) virtual payment cards and associated accounts such that earned rewards can be stored and spent by enrolled payment cardholders. The virtual card issuer 108 also communicates with the incentive management system 106 to receive information regarding rewards earned by the enrolled payment cardholder. In response to receiving an instruction to apply rewards, the virtual card issuer uses a payment processor 146 (e.g., a program, function, sub-routine, or the like) to credit the account of the enrolled payment cardholder identified in the instruction. The virtual card issuer 108 also interacts with the payment network 102 (e.g., transaction server 126) and the incentive management system 106 to receive transaction authorization requests and authorization or decline instructions from the incentive management system 106. Likewise, the virtual card issuer 108 operates as an issuing bank to settle authorized transactions and communicate when transaction authorization requests or denied. The virtual card issuer 108 can also communicate rewards account balances to the incentive management system 106 for authorization determinations or make that determination itself as part of the transaction authorization process (e.g., does the enrolled payment cardholder have a sufficient balance to cover the transaction amount). These and/or other functions are accomplished using the payment processor 146, processor 128, communications device 132, memory, or other components/processes. In some embodiments, the virtual card issuer 108, as the issuer of the virtual payment card, does not make transaction authorization determinations of any type. Instead those determinations are made by the incentive management system 106 as described herein.

In some embodiments, the virtual card issuer 108 also interacts with the customer device 118 to update account balances associated with the virtual payment card held within the customer device's 118 virtual wallet 144. This interaction can take the form of a push notification sent by the virtual card issuer 108 to the enrolled payment cardholder device 118 such that an application handles the push notification and updates the account balance visible within the application/virtual wallet 144. In alternative embodiments, these functions are handled by the incentive management system 106 as described herein. In alternative embodiments, the virtual card issuer 108 does not communicate directly with the customer device 118 (the communication being instead handled by the incentive management system 106 and payment network 102).

The customer device 118 is any device suitable for running an application of the type described herein and communicating with a merchant point of sale device 120. The customer device can be, for example, a smartphone device having a processor, memory, communications device 132, and be capable of maintaining a virtual wallet 144. The customer device 118 communicates at least with the incentive management system 106 and the merchant point of sale device 120. The customer device 118 communicates with the merchant point of sale device 118 (e.g., using near field communication, Bluetooth communication, Wi-Fi communication or the like) to provide at least a virtual payment card account number associated with the enrolled payment cardholder and the account associated with the enrolled payment cardholder's rewards. This allows a transaction to be initiated. In response, the merchant point of sale device 118 transmits an authorization request through the payment network 102 and to the virtual card issuer 108.

It should be understood that the communications using the communications devices 132 can be made using any suitable technique to facilitate interoperability of the devices/systems/servers that are communicating. For example, the data request can be formatted to take advantage of an application programming interface (API) or other system that allows for the devices to communicate with one another. In this manner, the format of instructions, requests, returned information, and the like can be uniform or cross-operable between different components of the system.

Figure 4A:
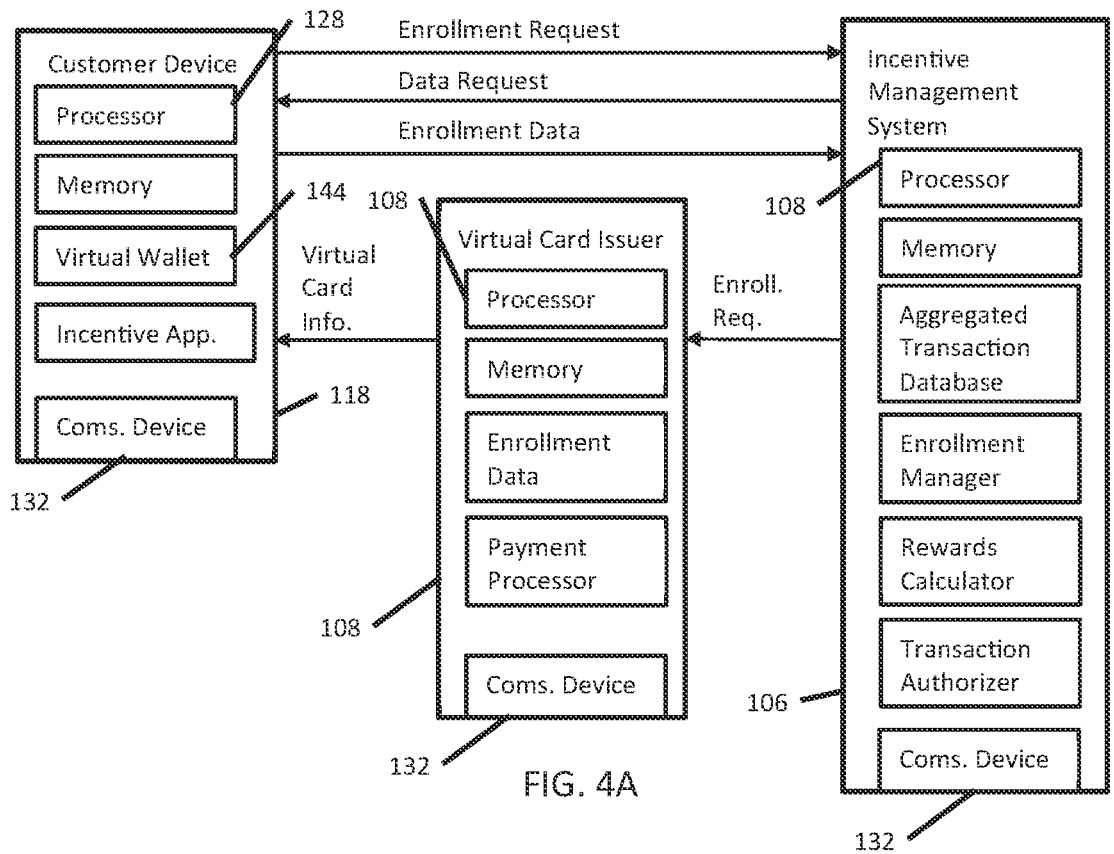
FIG. 4A is a simplified block diagram showing the communication between a customer device, incentive management system, and virtual card issuer as pertains to enrolling a customer such that the customer can earn and spend rewards.
Figure 4B:
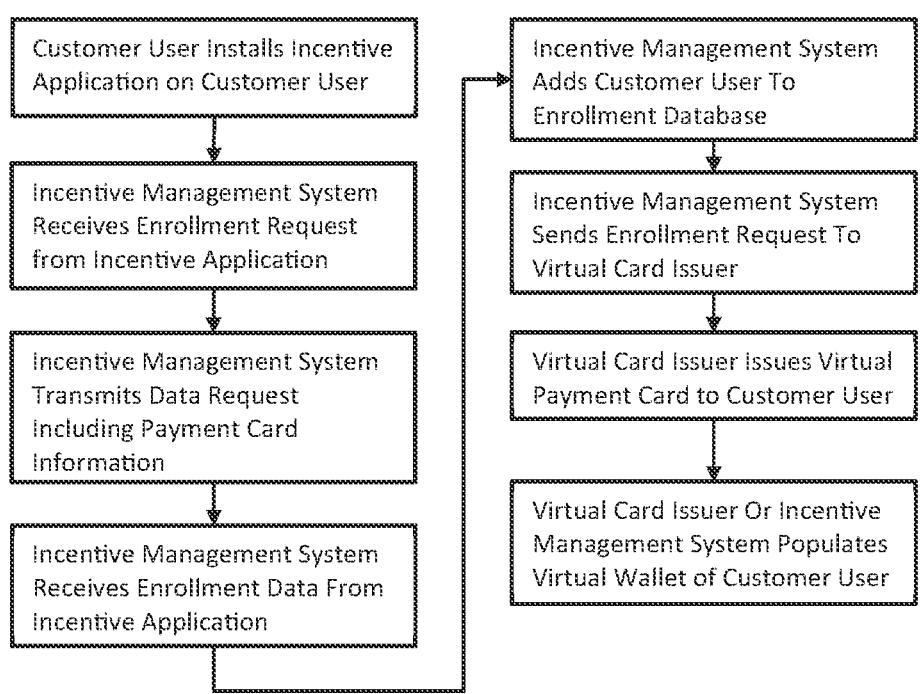
FIG. 4B is a flow chart showing steps of a method of enrolling a customer such that the customer can earn and spend rewards.

Referring now specifically to FIGS. 4A-4B, the process of enrolling a payment cardholder is shown in more detail and according to one embodiment. FIG. 4A shows a schematic of the data flow between the customer device 118, incentive management system 106, and virtual card issuer 108 in the context of enrolling the payment cardholder. FIG. 4B shows a flowchart illustrates the steps taken to enroll the payment cardholder.

Figure 5A:
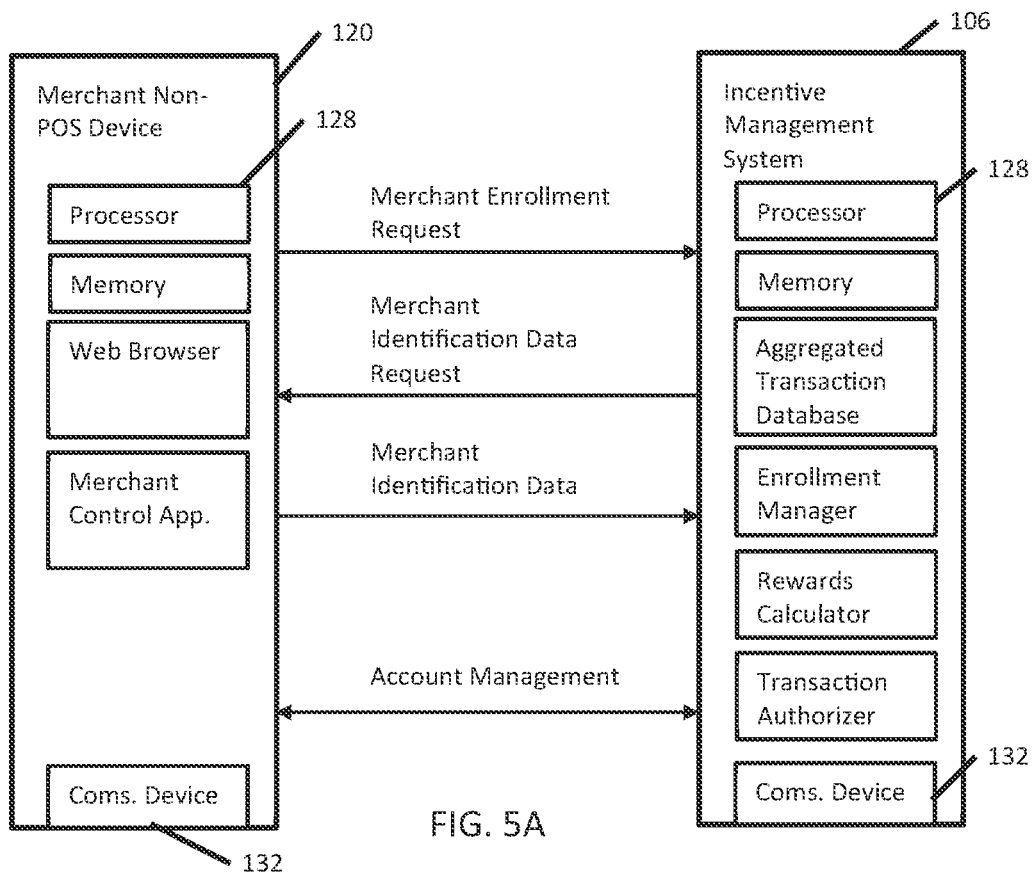
FIG. 5A is a simplified block diagram showing the communication between a merchant device and the incentive management system as pertains to enrolling the merchant such that the merchant can provide customer rewards and receive payments by customer rewards.
Figure 5B:
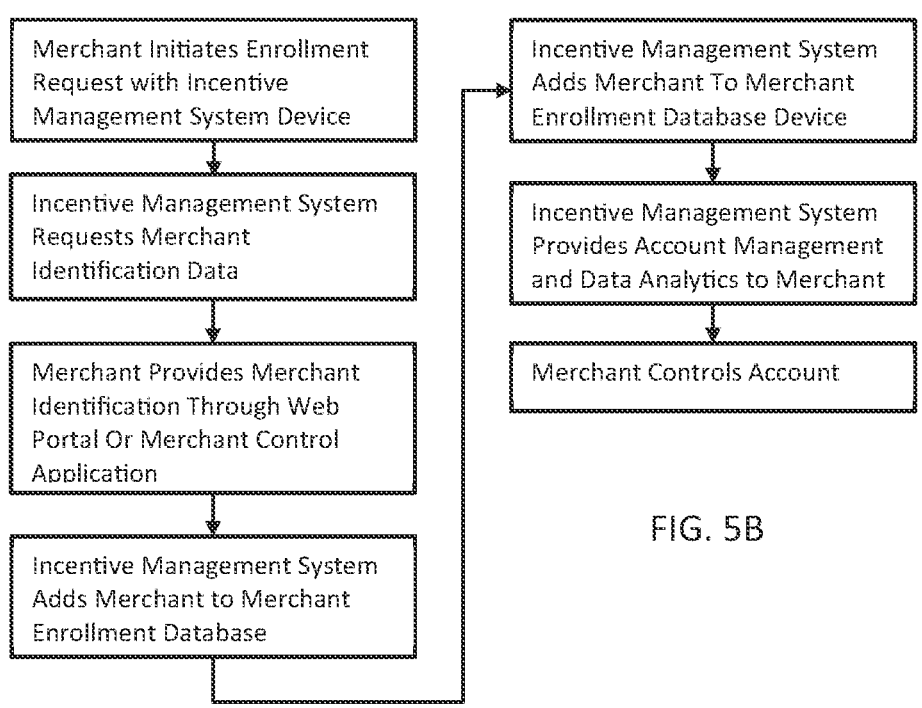
FIG. 5B is a flow chart showing steps of a method of enrolling a merchant such that the merchant can provide rewards and receive rewards payments.

Referring now specifically to FIGS. 5A-5B, the process of enrolling a merchant is shown in more detail and according to one embodiment. FIG. 5A shows a schematic of the data flow between a merchant non-point of sale device and the incentive management system 106 in the context of enrolling the merchant. FIG. 5B shows a flowchart illustrates the steps taken to enroll the merchant.

Figure 6A:
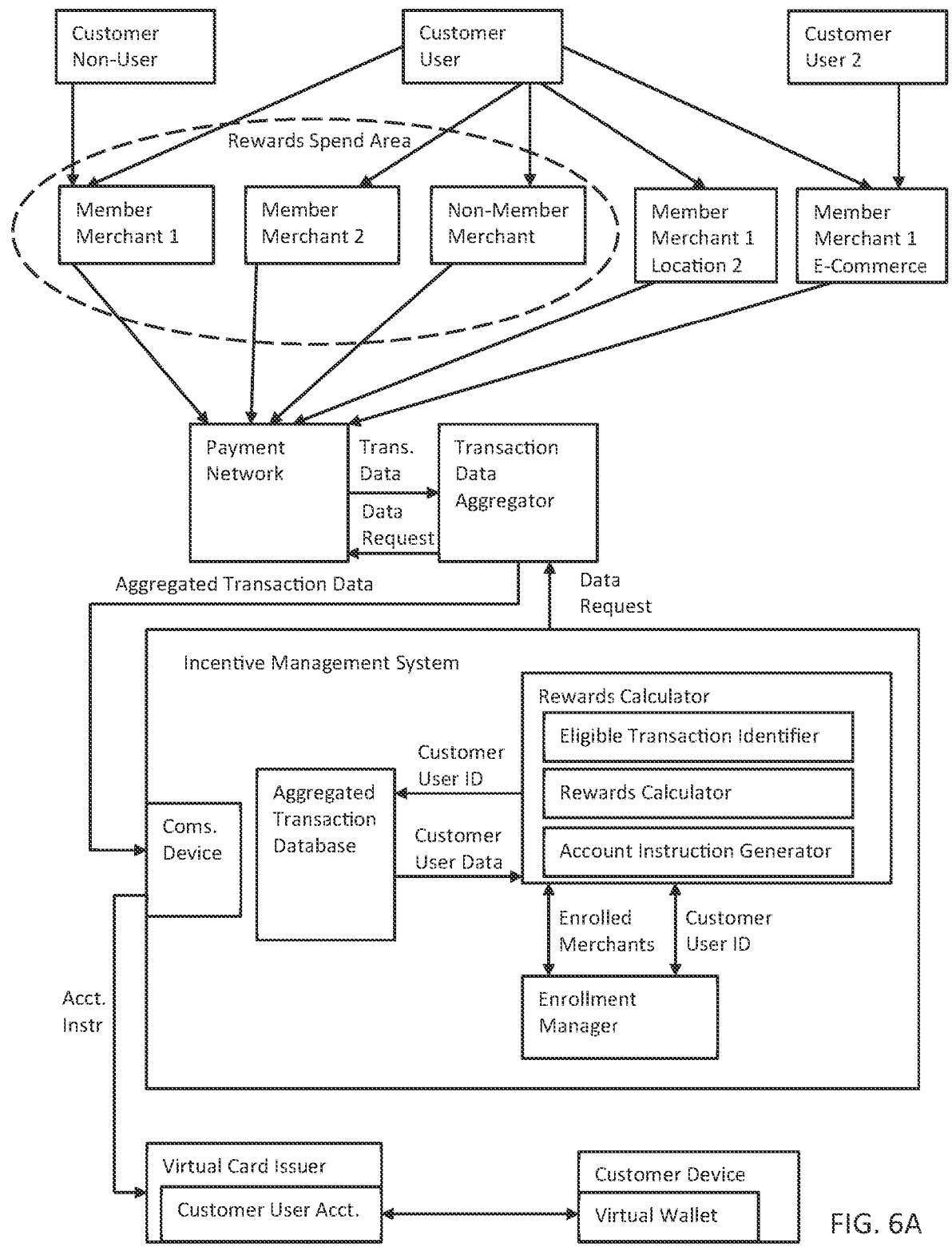
FIG. 6A is a simplified block diagram showing the relationship between systems and devices within and related to the transaction incentivizing system as pertains to customers earning rewards.
Figure 6B:
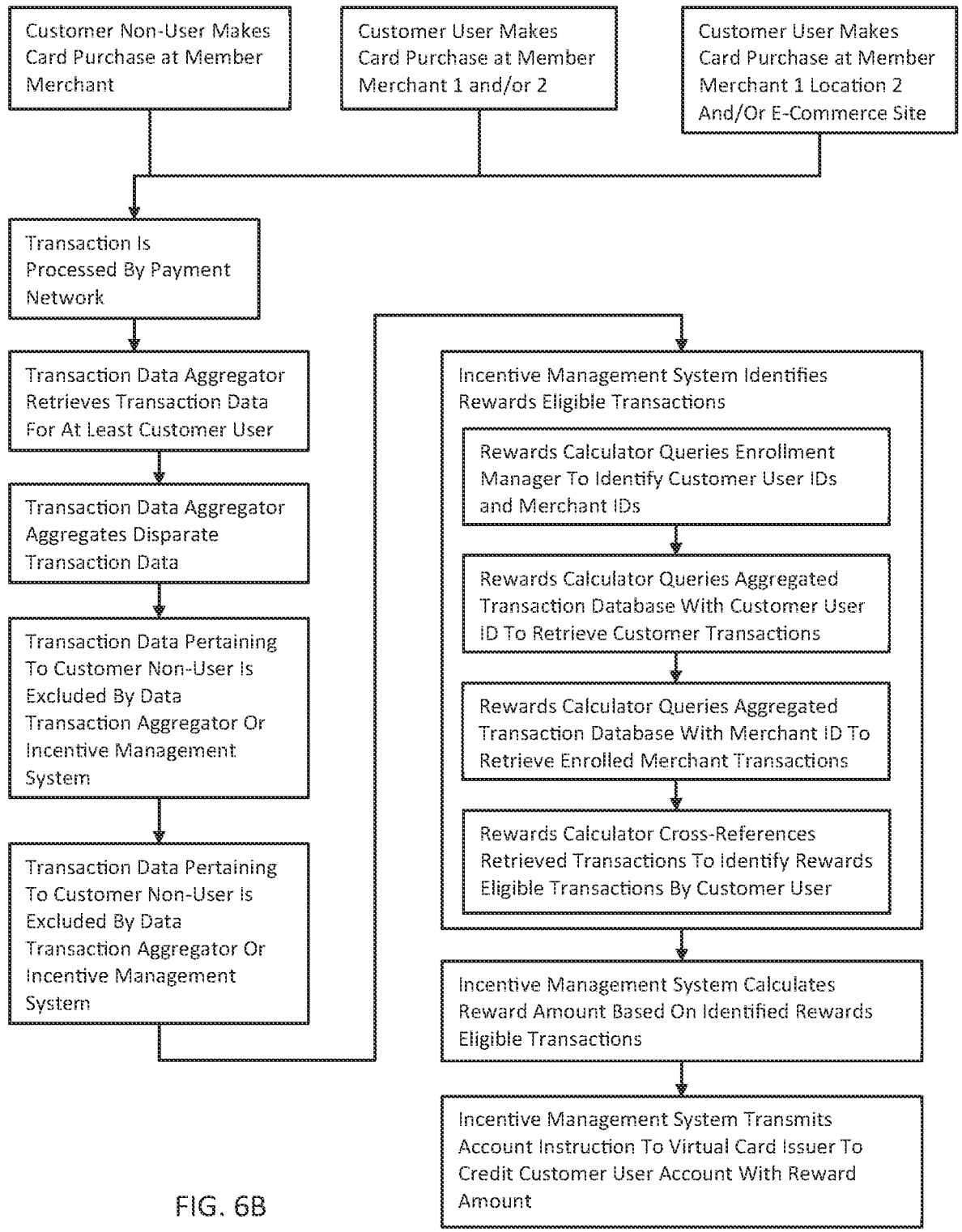
FIG. 6B is a flow chart showing steps of a method of generating rewards for customer purchases.

Referring now specifically to FIGS. 6A-6B, the process of identifying rewards eligible transactions, calculating rewards, and applying rewards to a virtual payment card account is shown in more detail and according to one embodiment. FIG. 6A shows a schematic of the data flow between a payment cardholder, merchant, payment network 102, transaction data aggregator 104, incentive management system 106, virtual card issuer 108, and enrolled payment cardholder device 118 in the context of enrolling the merchant. FIG. 6B shows a flowchart illustrates the steps taken to identify rewards eligible transaction, calculate rewards, and apply rewards to a virtual payment card account of an enrolled payment cardholder.

Figure 7A:
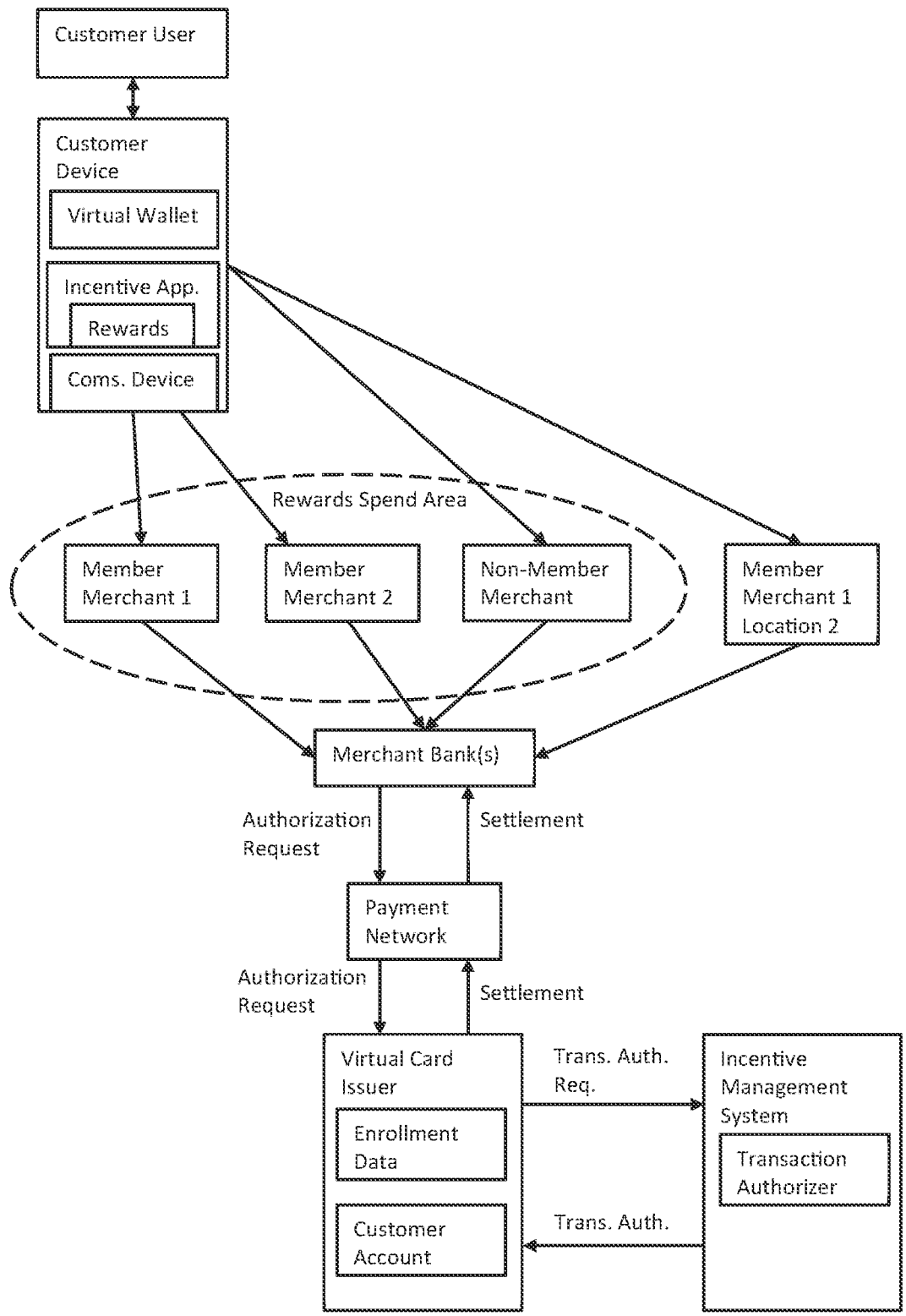
FIG. 7A is a simplified block diagram showing the relationship between system and devices within and related to the transaction incentivizing system as pertains to customers redeeming rewards.
Figure 7B:
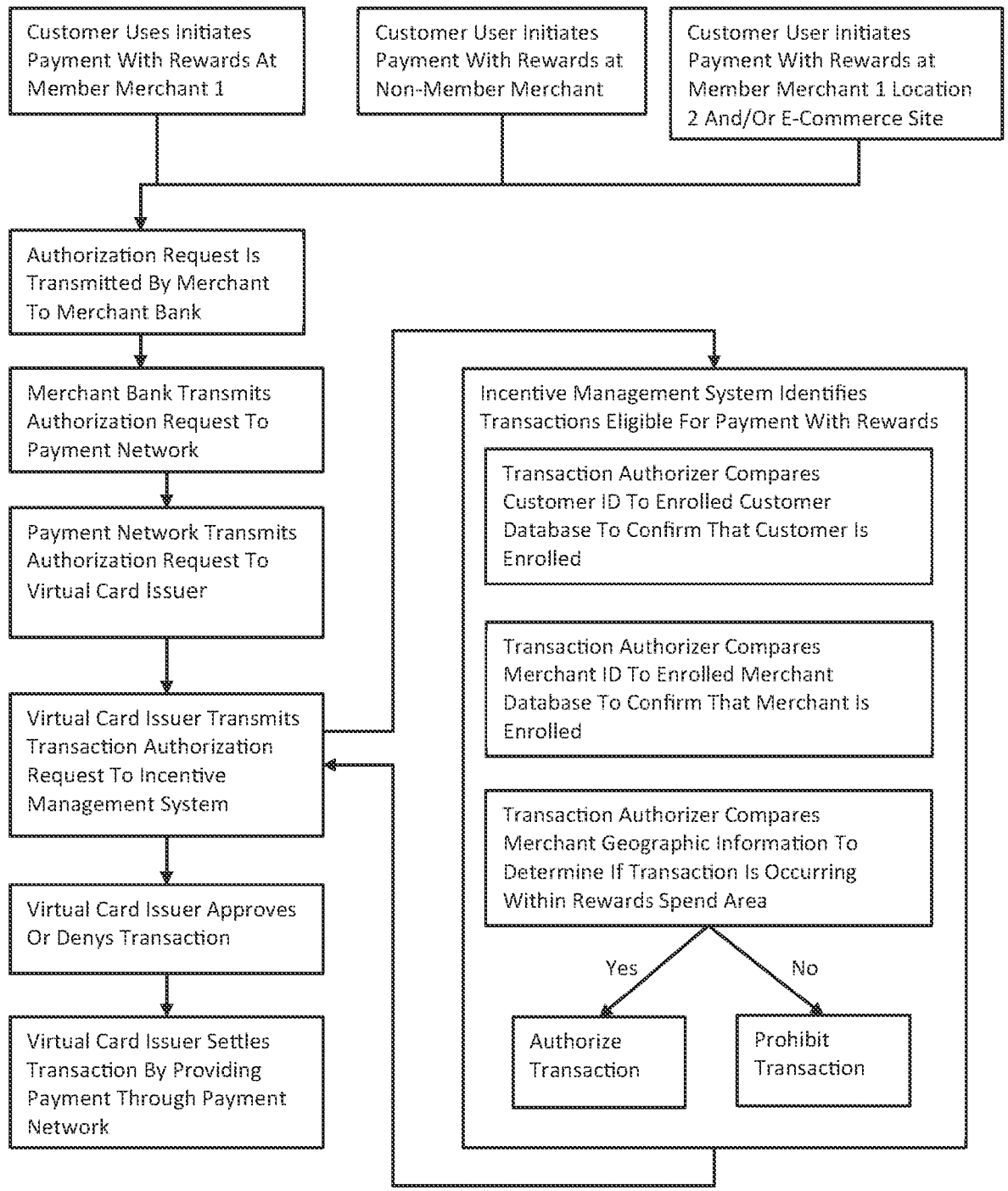
FIG. 7B is a flow chart showing steps of a method of customer redemption of earned rewards.

Referring now specifically to FIGS. 7A-7B, the process of authorizing the spending of rewards by a virtual payment card held by an enrolled payment cardholder is shown in more detail and according to one embodiment. FIG. 7A shows a schematic of the data flow between a payment cardholder's virtual wallet, merchant, payment network 102, virtual card issuer 108, and incentive management system 106 in the context of authorizing the spending of rewards using the virtual payment card and spending those rewards. FIG. 7B shows a flowchart illustrates the steps taken to process an adultization request for spending rewards using a virtual payment card and the spending of such rewards.

Referring now generally to FIGS. 1-7B, the process described herein is described in relation to a single payment card held by an enrolled payment cardholder. Purchases made with the single payment card being capable of earning rewards so long as the other conditions described herein are met. This description is made relative to a single payment card for simplicity. It should be understood that the same processes, methods, systems, equipment, etc. can be used with respect to a plurality of payment cards held by an enrolled payment cardholder. In such cases, identification information should be read to include such information for each payment card. To facilitate functioning of the system 100, the incentive management system 106 can, upon enrollment, generate a new enrolled payment cardholder master identification (e.g., master identification number). This number is attached to database entries that include cardholder identification information associated with the enrolled payment cardholder. Thus, the master identification is generated and associated with cardholder identification data stored in the enrolled payment cardholder database and associated with transactions including any of the payment cards held by the single enrolled payment cardholder. The master identification is also transmitted to the virtual card issuer 108 along with instructions to apply earned rewards such that rewards earned from purchases on multiple different payment cards are applied to the account of the common payment cardholder who has used their different payment cards. The master identification can be the account number associated with the virtual payment card issued by the virtual payment card issuer 108.

In an alternative embodiment, the same process is preformed but is instead driven by the virtual card issuer 108. When a payment cardholder is enrolled, the virtual card issuer 108 establishes (e.g., issues) a virtual card and creates an account. That account number is transmitted to the incentive management system 106 which then uses it as the master identification as just described in order to track rewards earned by a single enrolled payment cardholder through the use of multiple of their payment cards. Each payment card is separately added through the application on enrolled payment cardholder's device 118 and associated with the master identification by the incentive management system 106.

Likewise, identification data for merchants can encompass a single merchant's multiple locations and/or E-commerce website/application. This can be done with multiple entries and/or a master identification similar to the type previously described. This allows, for example, purchases at multiple locations and/or online purchases by an enrolled payment cardholder to earn rewards. Individual transactions can still be authorized based on the specific location of the merchant (regardless of the merchant having multiple locations) in order to geographically restrict the redemption of rewards consistent with such description herein. Therefore, the database of enrolled merchant identification data can include merchant identification data for a single merchant corresponding to both a physical location and an internet accessible purchase portal, such that the incentive management system 106 is adapted and configured to generate rewards for transactions conducted with an enrolled merchant for both physical location sales and internet sales. For a single enrolled merchant, the database of enrolled merchant identification data can include a first datum corresponding to the enrolled merchant's online storefront and includes a second datum corresponding to the enrolled merchant's physical storefront.

Still referring generally to FIGS. 1-7B, in some embodiments, the system 100 is capable of acquiring historical transaction data. This historical transaction data can be used to generate rewards but in the preferred embodiment is not. In the preferred embodiments of the system 100, the historical transaction data is used to predict future enrolled payment cardholder purchases, match the enrolled payment cardholder with new merchants or brands of potential interest based on past purchases and/or other data (e.g., recommend purchases), present offers to the enrolled payment cardholder, calculate a customer lifetime value of the enrolled payment cardholder, or perform other analytic processes. The system 100 provides an advantage in that it can acquire historical transaction data for these analytical processes. The system 100 also has an advantage in that the earning of rewards drives further transactions which can then be captured and used as inputs to these analytical processes. The system 100 also capture data that is typically not available from individual merchants due to their unwillingness or inability to collect or share such data. By acquiring transaction data (historic and/or prospective), the system is able to perform analytics of value to a shopping mall lessor, merchant, or other parties. The analytic processes capable of being performed thanks to the data collection provided by the system 100 are described in greater detail later herein.

As regards to acquiring historical transaction data, the incentive management system 106 can, in response to enrolling a payment cardholder, transmit a data request from the incentive management system to the transaction data aggregator 104 seeking transaction data associated with the enrolled payment cardholder, the data request seeking historical transaction data. The request includes at least cardholder identification information (e.g., a payment card number). The incentive management system 106 receives, from the transaction data aggregator 104, historical transaction data corresponding to transactions occurring before the payment cardholder was enrolled and to which the payment cardholder was a party. The historical transactions data can correspond to a time period of between one and three years prior to a date on which the payment cardholder is enrolled. The time period can also be up to two years prior to a date on which the payment cardholder is enrolled. The two-year period is particularly advantageous in that it has been found to encompass enough transactions information over a long enough period for meaningful use in analytic processes described herein while simultaneously remaining a reliable reflection of the enrolled payment cardholder's historical activity.

Figures 1, 8A:
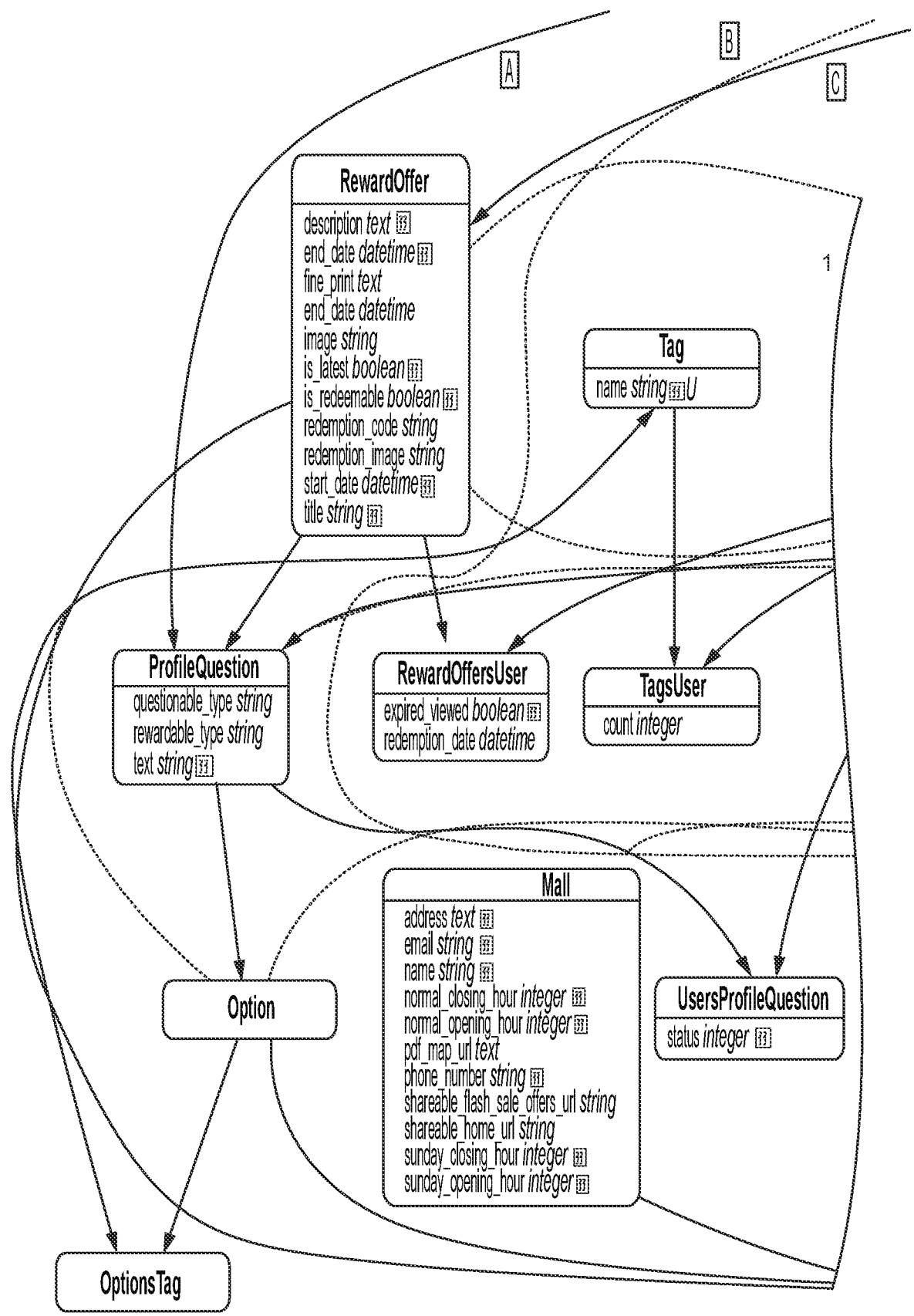
Figures 2, 8A:
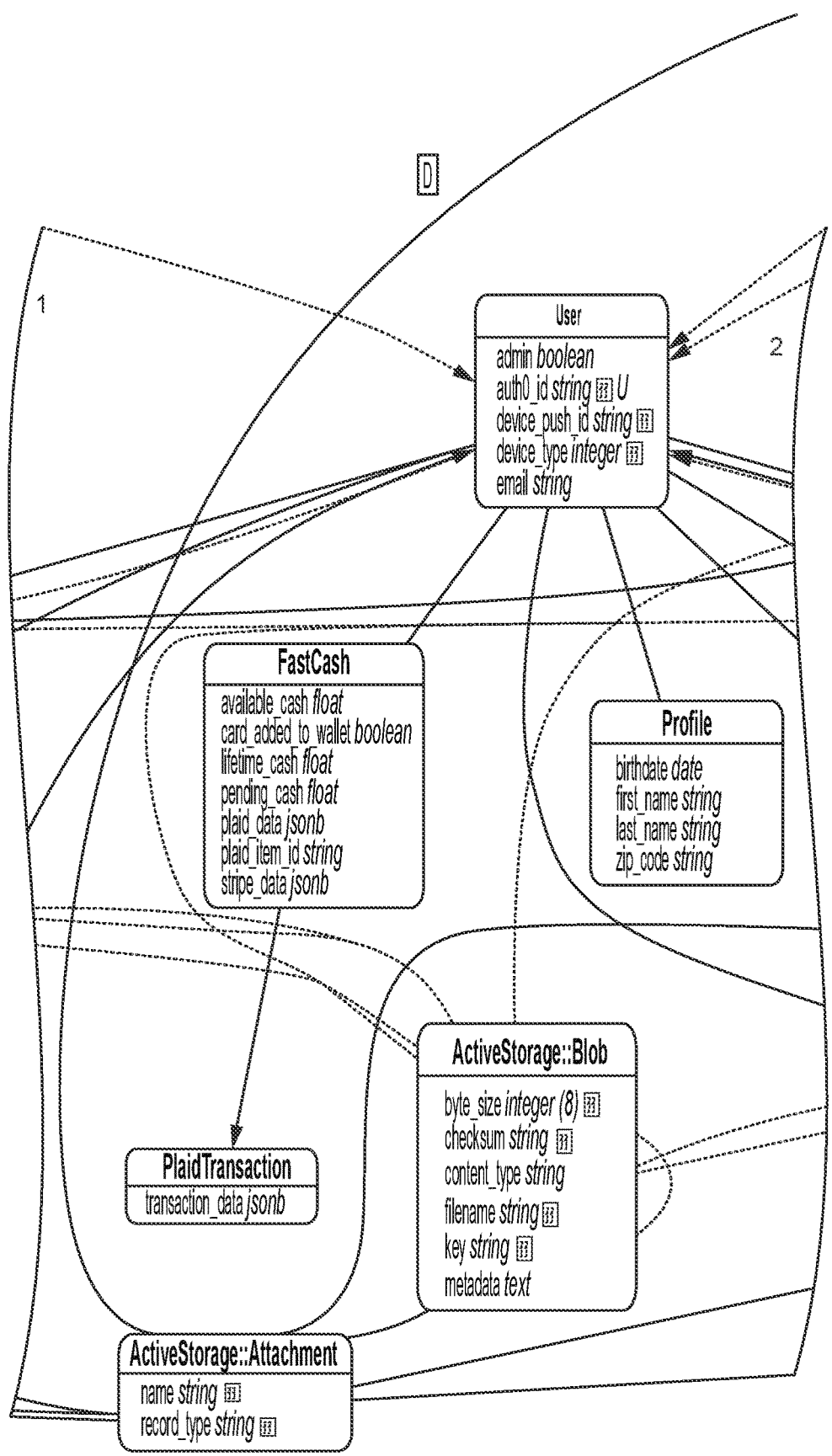
Figures 3, 8A:
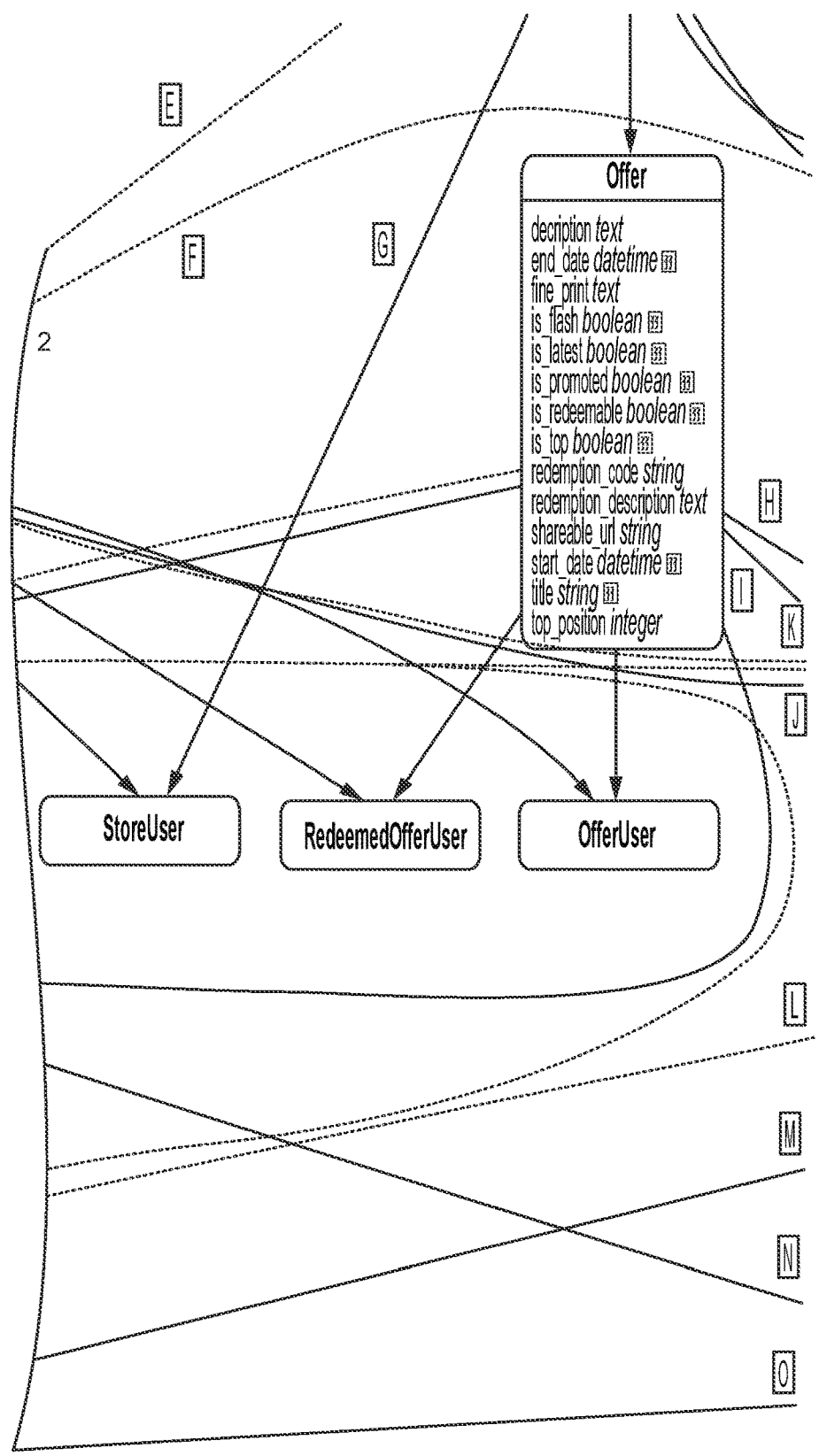
Figures 1, 8B:
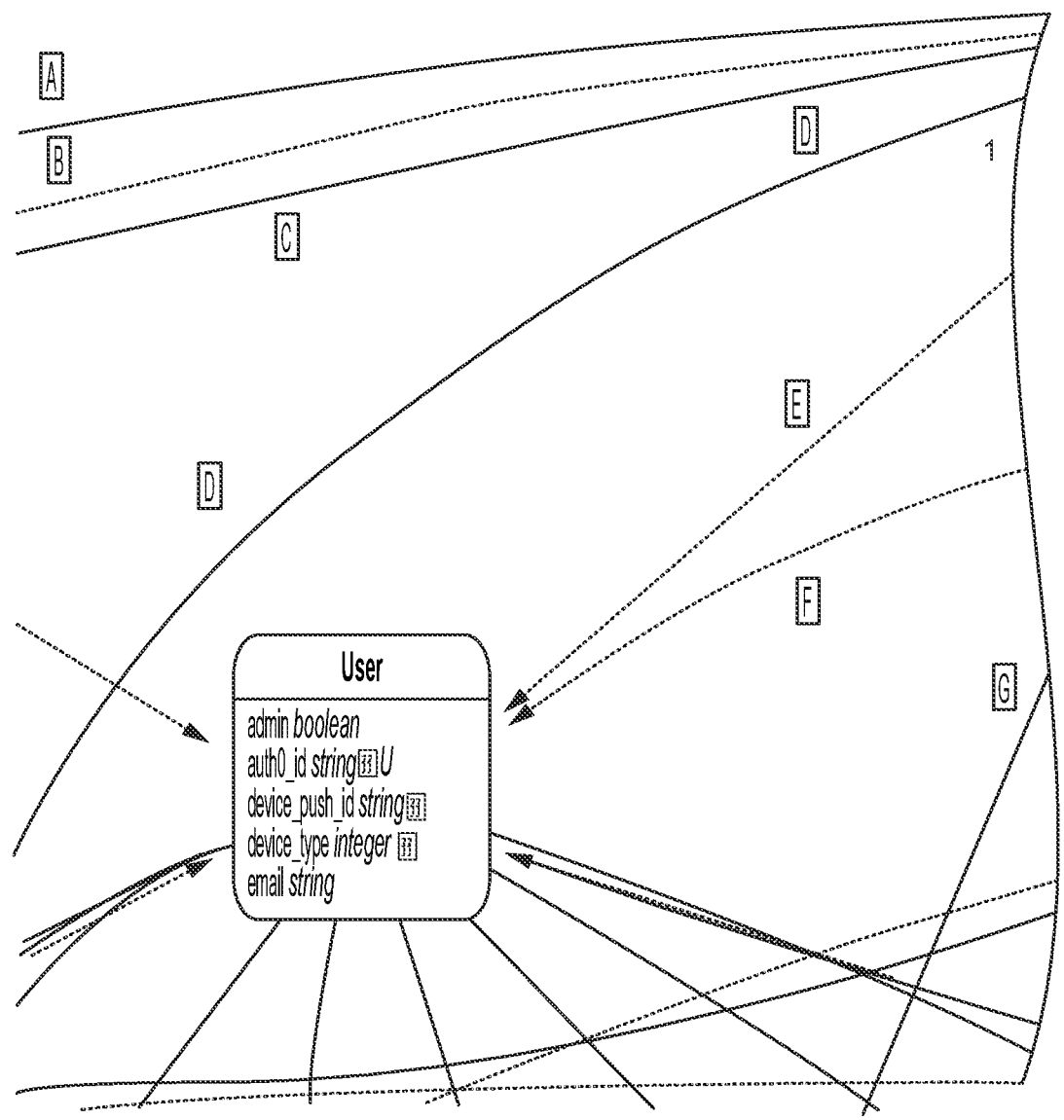
Figures 2, 8B:
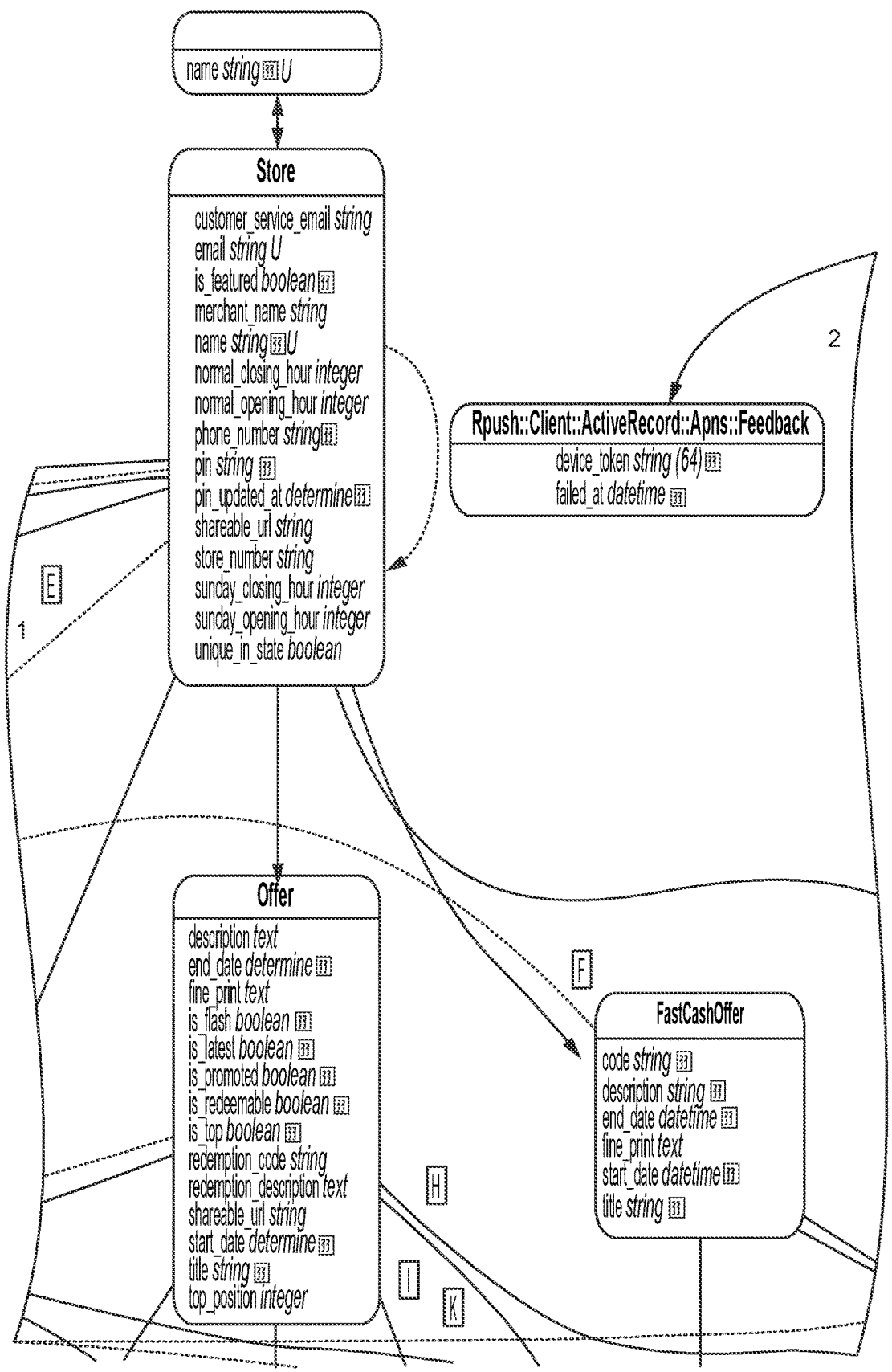
Figures 3, 8B:
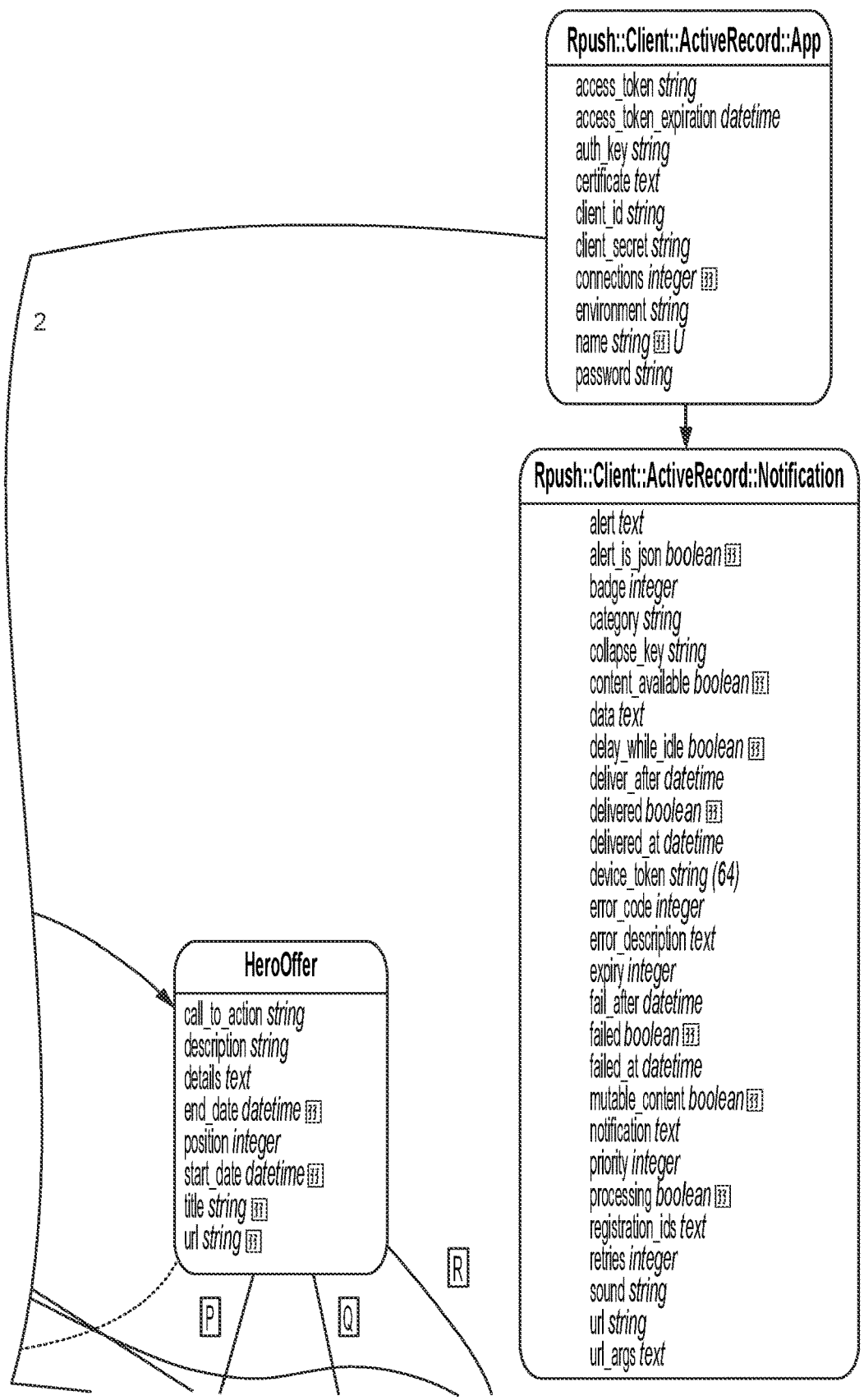
Figures 1, 8C:
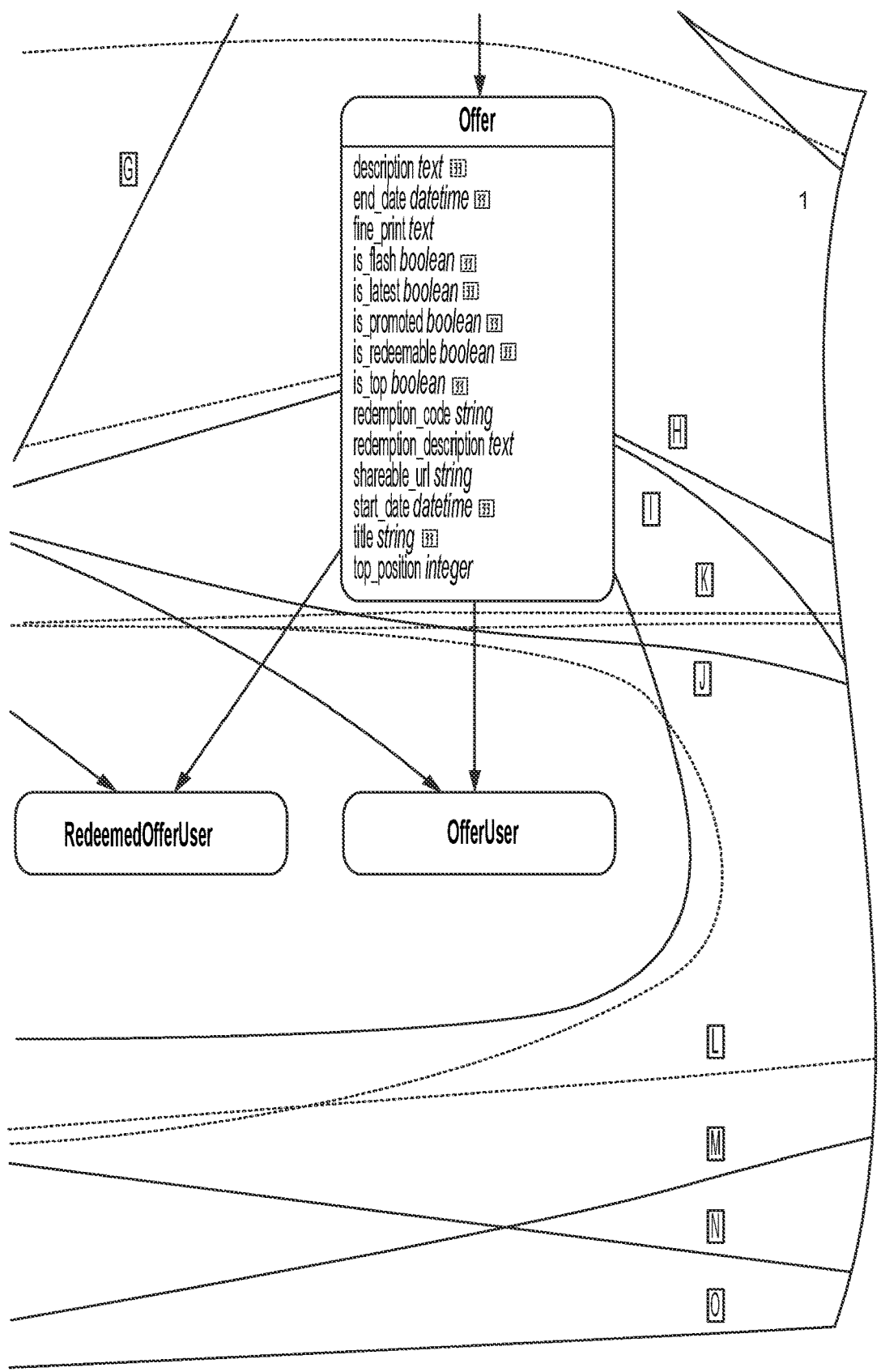
Figures 2, 8C:
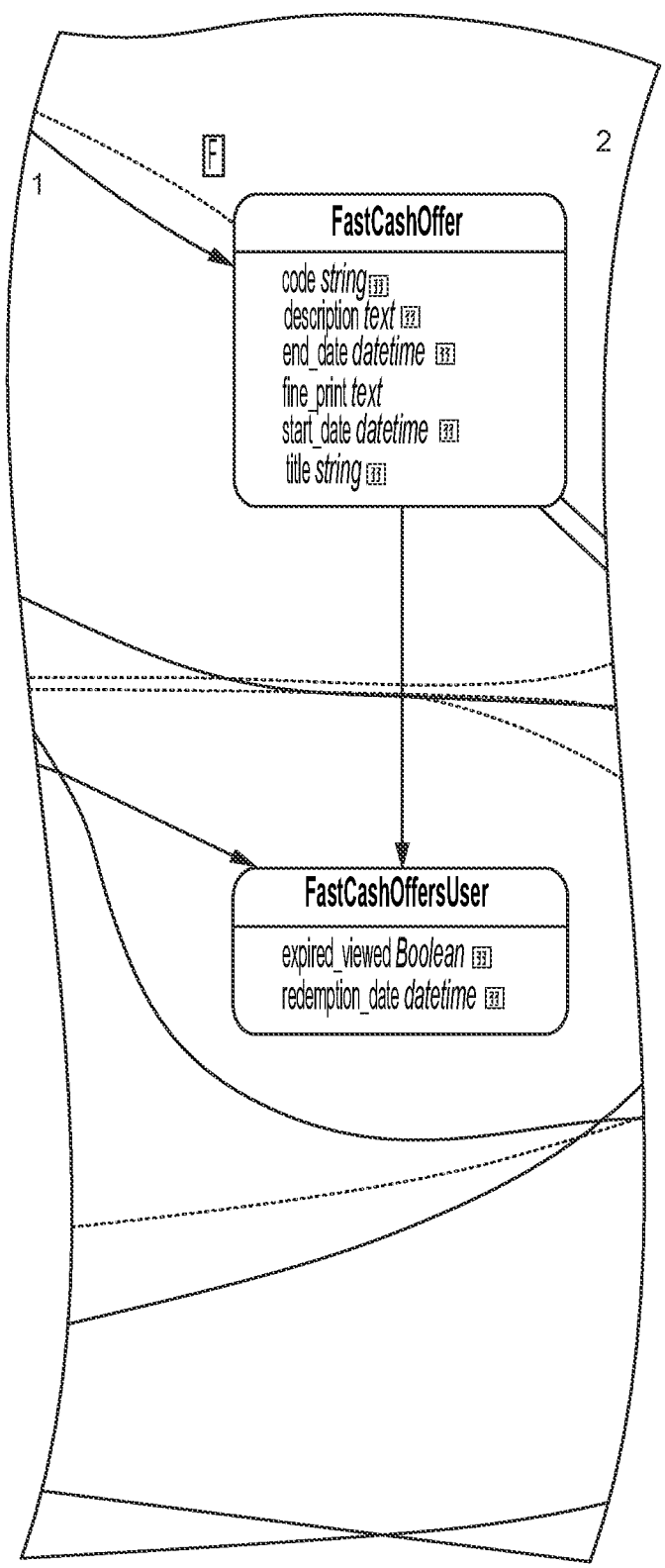
Figures 3, 8C:
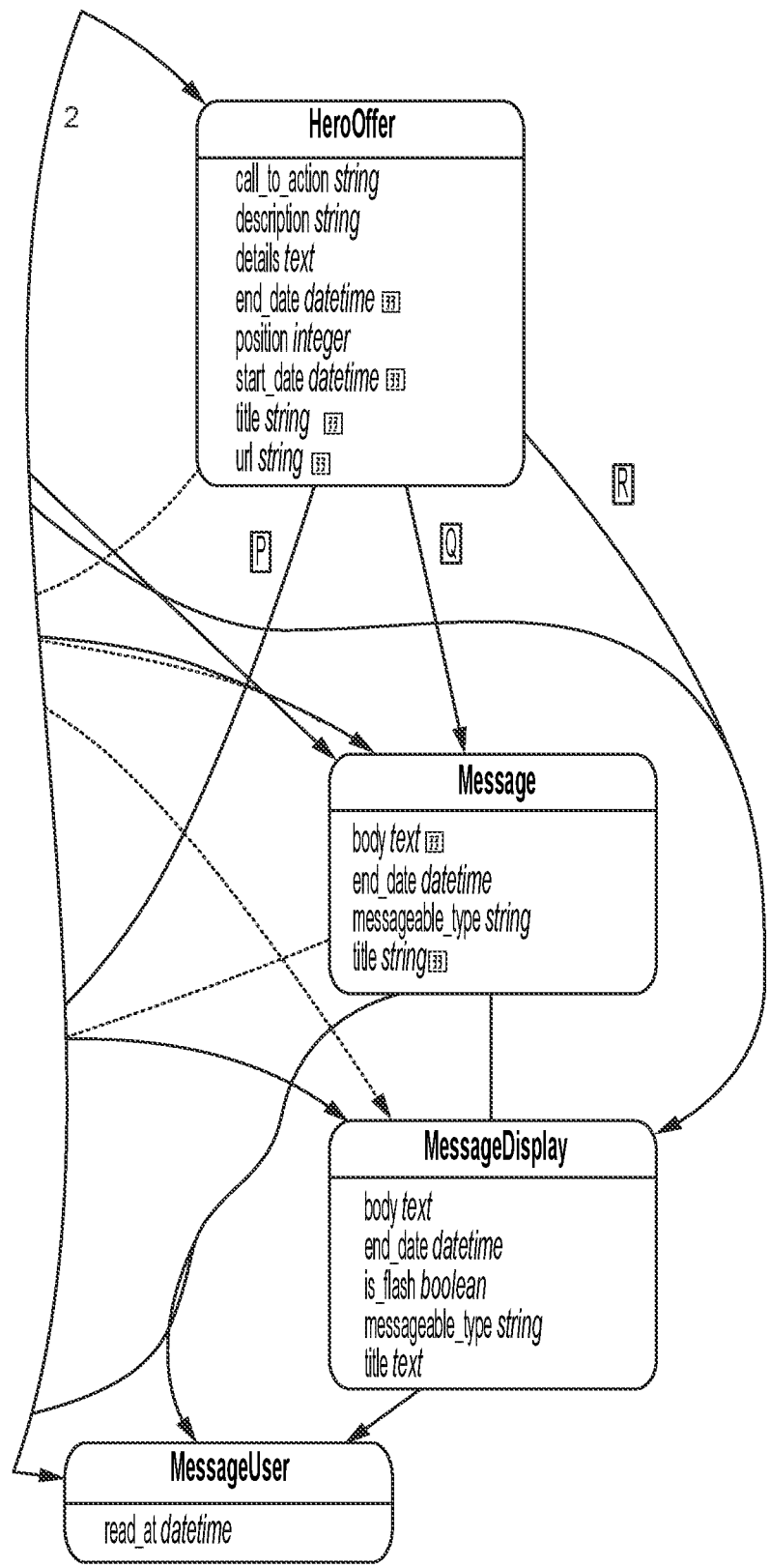

Turning now to analytical processes that can be performed as a result of the data collection provided for by the system 100, FIGS. 8A-8C illustrate interconnected portions of a relational data model that portrays the data points that are captured through the system 100 (including inputs through the application running on the enrolled cardholder device 118) as well as the relationship between different data points. The system 100 has an advantage in the variety, scale, and types of data that are collected for use in predicting further enrolled cardholder purchases and activities as well as for use in providing recommendations to enrolled cardholders. Generally speaking, the system 100 captures information about enrolled cardholder demographics, enrolled cardholder brand interests, enrolled cardholder behavior, and enrolled cardholder transactions. This information data set is used for a variety of analytical processes described herein—e.g., to predict further behavior of enrolled payment cardholders, to predict and calculate a customer lifetime value associated with the enrolled payment cardholder (e.g., value to a specific brand, value to the geographic location, etc.), to recommend products and brands to the enrolled payment cardholder, or the like.

Figures 1, 9:
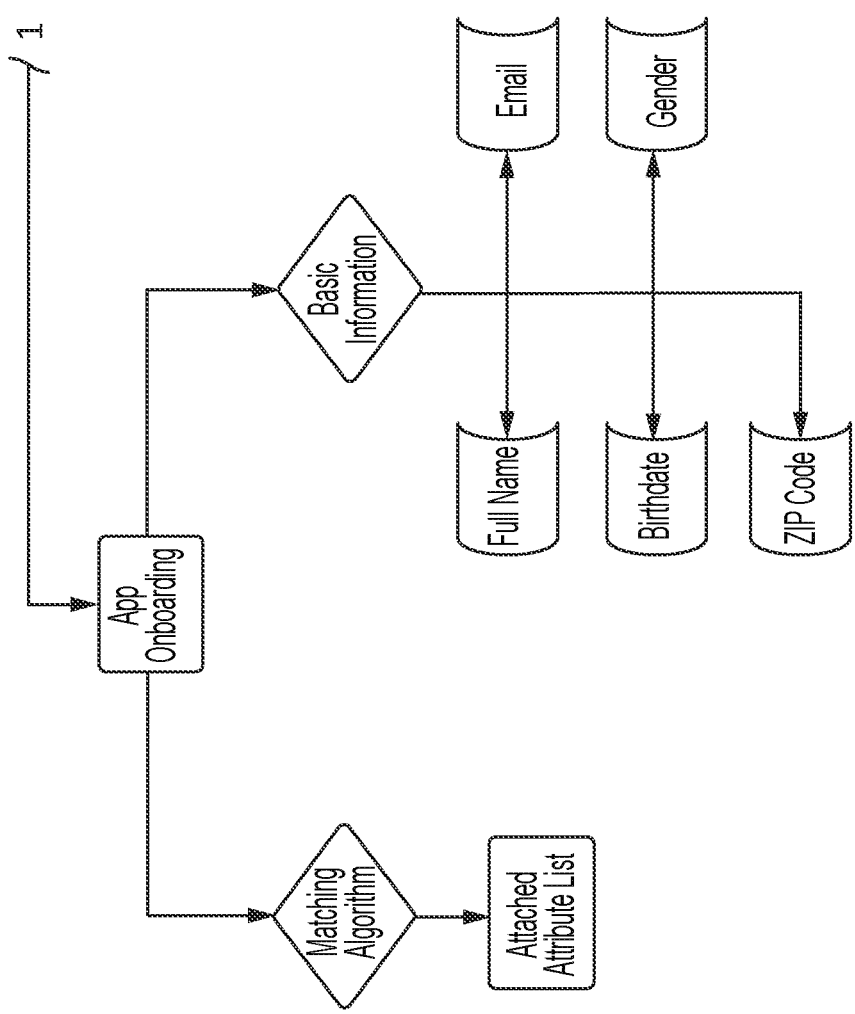
Figures 2, 9:
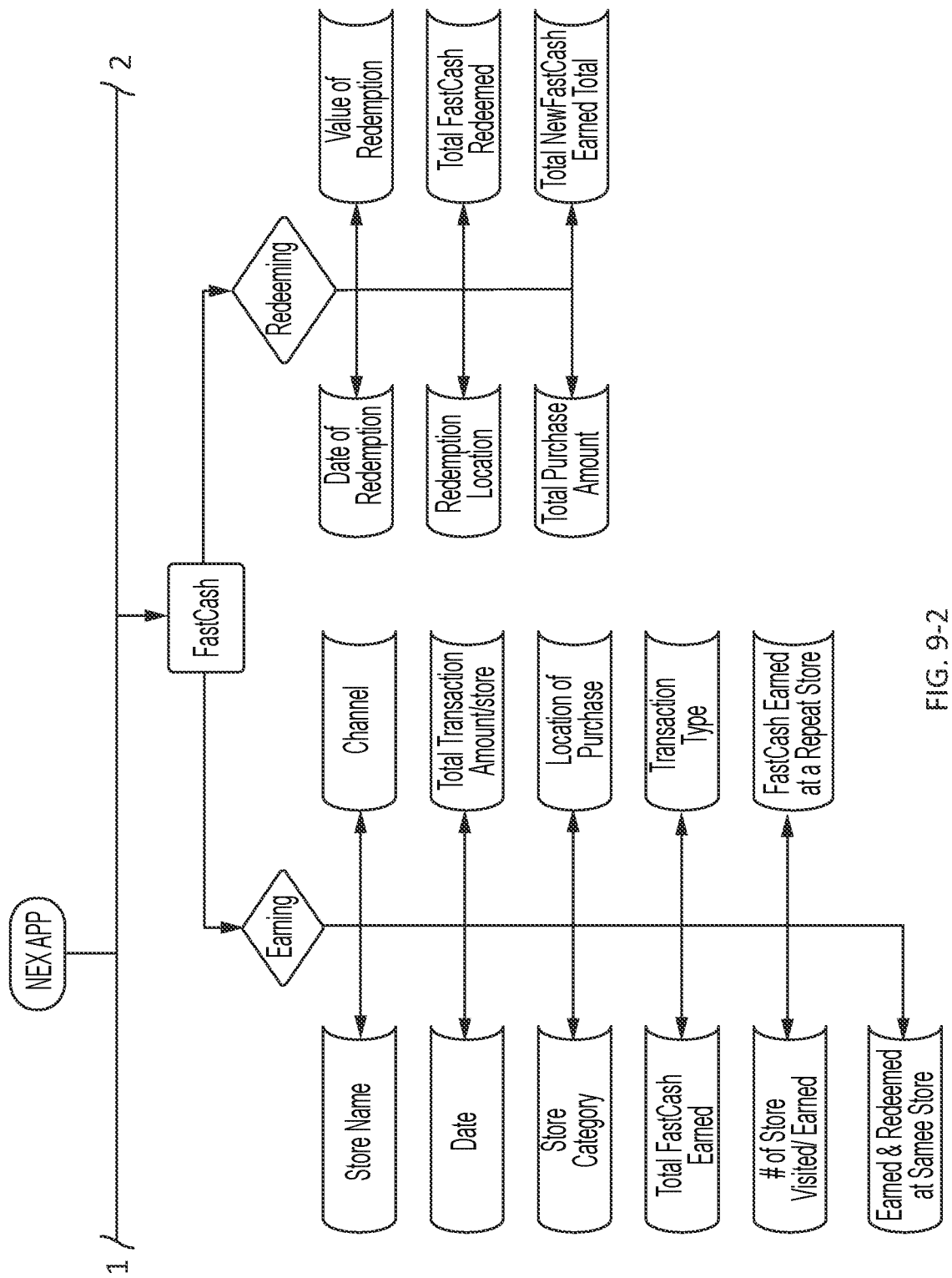
Figures 3, 9:
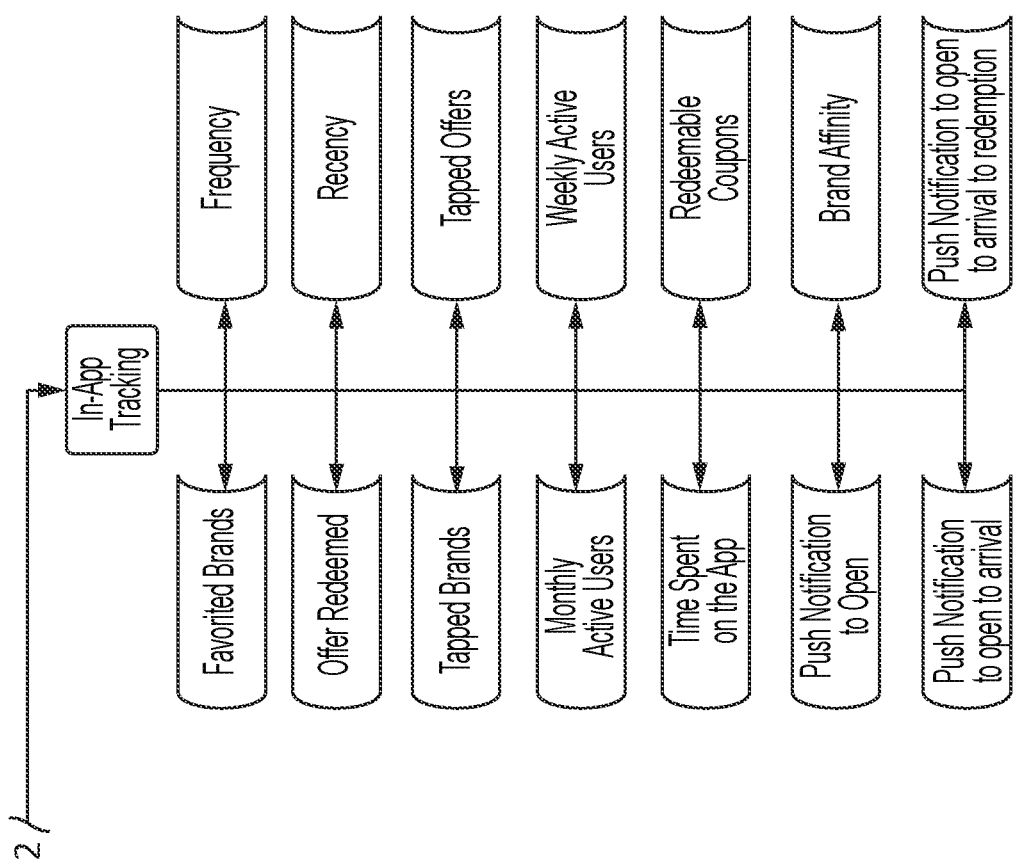

Referring generally to FIGS. 8A-8C and specifically to FIG. 9 (a simplified data model), the system 100 collects cardholder demographics through the enrollment process and using the application running on the enrolled cardholder's device 118. The system 100 collects enrolled cardholder brand interests through the application running on the enrolled cardholder's device 118. The system 100 collects enrolled cardholder behavior data through cardholder interaction with prompts provided by the application running on the enrolled cardholder's device 118. The system 100 collects enrolled cardholder transactions using the processes previously described herein which facilitate the identification of rewards eligible transactions (e.g., using the transaction data aggregator 104 to gather transactions made by enrolled payment cardholders).

Discussing enrolled cardholder demographics specifically, this data set for use in the analytical processes described herein includes information such as name, e-mail address, address, birthdate, gender, sex, race, height, weight, shoe size, age, marital status, annual income, level of educational attainment, or like information. This information is collected by the system 100 by requesting the information using instructions (digital messages having executable program instructions) sent to the application running on the enrolled payment cardholder's device 118 (e.g., the application that at least in part allows the enrolled payment cardholder to view rewards balances and facilitate rewards spend transactions). The demographic information can be requested during enrollment of the payment cardholder by employing fillable fields, questionnaires, multiple choice selections, and the like. In order to improve data collection, the input requests seeking this information can be voluntary and coupled with an offer for rewards to be applied to the enrolled cardholder's account or other traditional promotional items (e.g., coupons). Further to increase participation in the collection of demographic data, the requests for such data can be spread over time using periodic prompts for data communicated to the enrolled payment cardholder by the application. Again, such requests prompted by the application can be coupled with enticements. In some embodiments, some data requests presented by the application are not optional. For example, requests for name, birthday, address, etc. can be made conditional with enrollment; the requests being made at the time of enrollment.

Discussing enrolled cardholder brand interests specifically, this data set for use in the analytical processes described herein includes information such as enrolled payment cardholder self-reported interest in specific brands, merchants, products, product categories, or the like. This data, like with the demographic data, is collected using the application running on the enrolled cardholder's device and can be collected at enrollment, over time, and/or with or without incentives. The data can collected using surveys, tagging of brands/categories in which the enrolled payment cardholder is interested, a ranked choice of brands offering products in similar categories (e.g., ranked preference of merchant's selling shoes), designating favorited brands, designated brands for which the enrolled payment cardholder wishes to receive special offers, or the like.

Discussing enrolled cardholder behavior specifically, this data set for use in the analytical processes described herein includes information that is gathered using the application running on the enrolled payment cardholder's device and includes interactions with information presented by the application itself and information provided the application corresponding to the enrolled payment cardholder's behavior in the physical world. Information presented on the application itself and the enrolled payment cardholder's interactions with the application itself include such data as interaction with targeted ads served by the application, browsing history through the application (e.g., brand pages viewed, number of clicks on each brand page/subpage, time on page, etc.), recency of use, frequency of use, recency of viewing a particular brand, frequency of viewing a particular brand, redemption of offers/coupons presented by the application, which push notifications are viewed, and the like. Information provided by the application corresponding to the enrolled payment cardholder's behavior in the physical world includes such information as geolocation data from the application indicating presence at various retailers within the geographic boundary (e.g., which merchants visited and for how long), check-in data corresponding to quick-reference codes scanned within the geographic boundary (e.g., the codes associated with particular merchants, particular offers, etc.), scanning of barcodes corresponding to specific products for sale for additional information on the product, and the like.

Discussing enrolled cardholder transaction data specifically, this data set for use in the analytical processes described herein includes information that is gather using the system 100 (e.g., the transaction data aggregator 104 and the incentive management system 106) and the application running on the enrolled payment cardholder's device. Transaction information includes historical transaction data (e.g., two years of historical transaction data reflecting transactions made by the enrolled payment cardholder) including associated transaction information such as transaction amount, date, merchant, channel (physical store or online purchase), transaction merchant category (e.g., retail, pharmacy, grocery, etc.). The transaction data is further broken down by and includes prospective transactions that occur in real time. This transaction data is added to the data set as the transactions occur. The transaction data also breaks out transactions that are made involving redemption of rewards through the system 100. All transaction information includes the transaction information described here and elsewhere herein. In some embodiments, redemption of rewards can be coupled with a request presented to the enrolled payment cardholder using the application for additional data about the rewards transaction. For example, the application can ask the enrolled payment cardholder to identify the product purchased (e.g., manually, by scanning a barcode, by confirming a predicted product predicted by the incentive management system based on transaction amount, etc.). Advantageously, this provides more granular data when product information is not otherwise available (e.g., if the transaction information does not include stock keeping unit information). In some embodiments, the transaction data can include stock keeping unit information.

All of the data pertaining to information about enrolled cardholder demographics, enrolled cardholder brand interests, enrolled cardholder behavior, and enrolled cardholder transactions is collected and assigned to enrolled payment cardholders as attributes. The attributes can be binary (e.g., Boolean) or on a scale. These attributes are used by the incentive management system 106 to recommend merchants for customers (e.g., enrolled payment cardholders) to shop with, to provide customers with targeted advertising/deals/promotions, predict and calculate a customer lifetime value (to the brand, to the geographic location, to a prospective brand considering opening a store within the geographic location), etc. The attributes for each enrolled cardholder are stored in a database that may also include transaction information associated with the particular enrolled payment cardholder. One embodiment of such a database is described in greater detail later herein with respect to FIG. 11.

In order to preform these functions (e.g., analytical processes), a variety of techniques can be used. In some embodiments, all enrolled payment cardholders are placed into cohorts with like enrolled payment cardholders based on overlaps with the attributes between the enrolled payment cardholders. Cardholders can be placed in multiple cohorts. The cohorts can be established by machine learning, neural networks, seeded manually and iterated, collaborative filtering, or the like. Using the established cohorts, behaviors can be predicted, recommendations made, customer lifetime value calculated, etc. based on the actions some in the cohort have taken (e.g., purchase) that others in the same cohort have not (e.g., they are predicted to take the same or a similar action/purchase by being in the same cohort in which the enrolled payment cardholders share substantial attributes).

In one embodiment, the analytical processes (specifically matching and recommending) are conducted using collaborative filtering with or without machine learning. Collaborative filtering being the technique known by those of skill in the art as the process of filtering for information or patterns using techniques involving collaboration among multiple agents, viewpoints, data sources, etc. The collaborative filtering used can be memory-based, model based, a hybrid memory-model based collaborative filtering, deep-learning based, or the like. In some embodiments, an objective function for the collaborative filtering can a customer lifetime value such that the analytical process predicts and cohorts enrolled payment cardholders based on customer lifetime value. Customer lifetime value is a calculation known to those skilled in the art of the total vale to a business of a customer over the whole period of their relationship and is based at least in part on the recency of purchases, frequency of purchases, and value of purchases. The calculation of customer lifetime value is known to those skilled in the art.

The system 100 provides a significant advantage primarily in that it collects more data and data of types that is not otherwise available (e.g., in a shopping center context). This data can be used by the collaborative filtering analytical technique and/or customer lifetime value calculation technique to achieve more accurate outcomes to the improved quality and amount of data. Further the rewards-based ecosystem encourages further participation by enrolled payment cardholders such that data is continuously generated further improving the analytical processes. Thus, customer recommendations, predictions of customer behavior, calculations of customer lifetime value, and the like are improved in their accuracy and usefulness as well as are made possible in the context of a geographically prescribed area (e.g., a shopping center lessor) where the data would otherwise not be available (e.g., due to a lack of information sharing or lack of information generation).

Figures 1, 10:
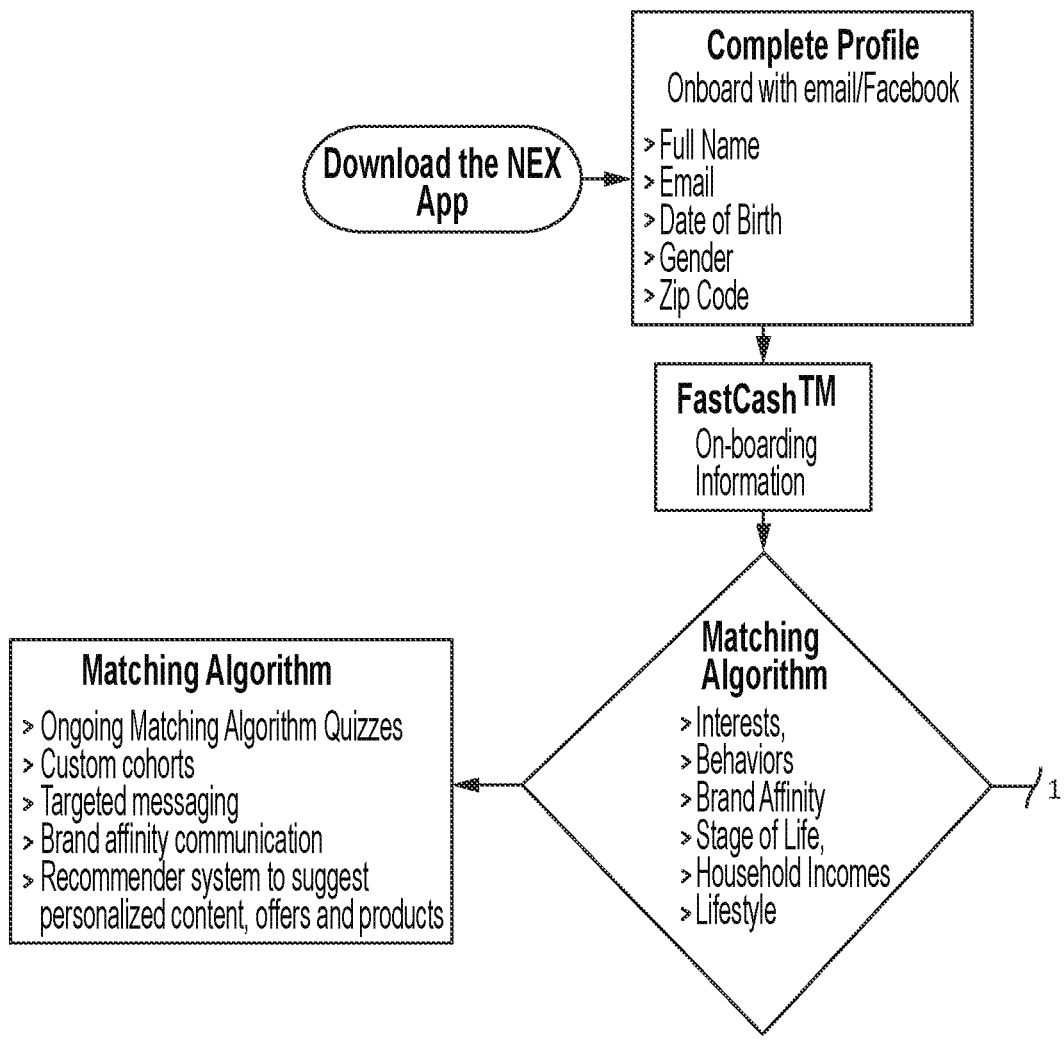
Figures 2, 10:
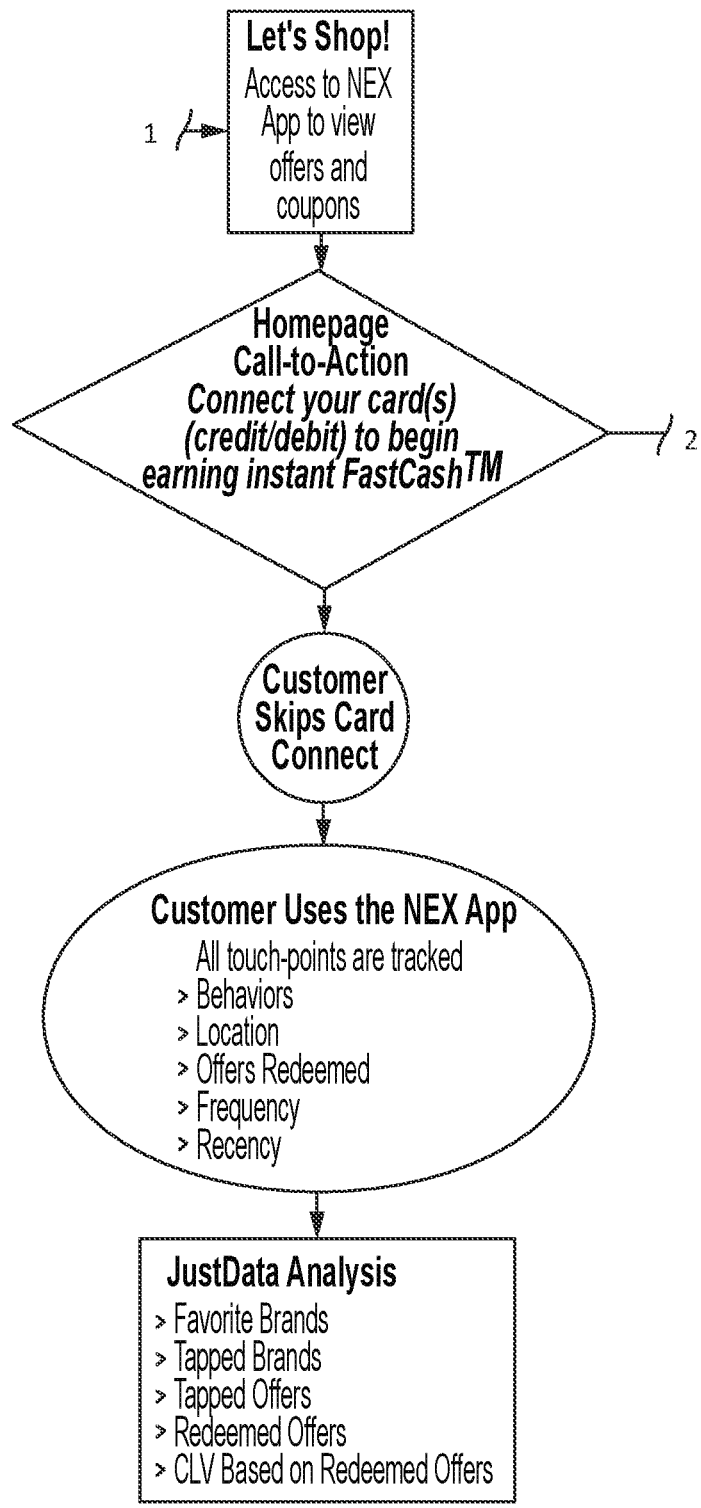
Figures 3, 10:
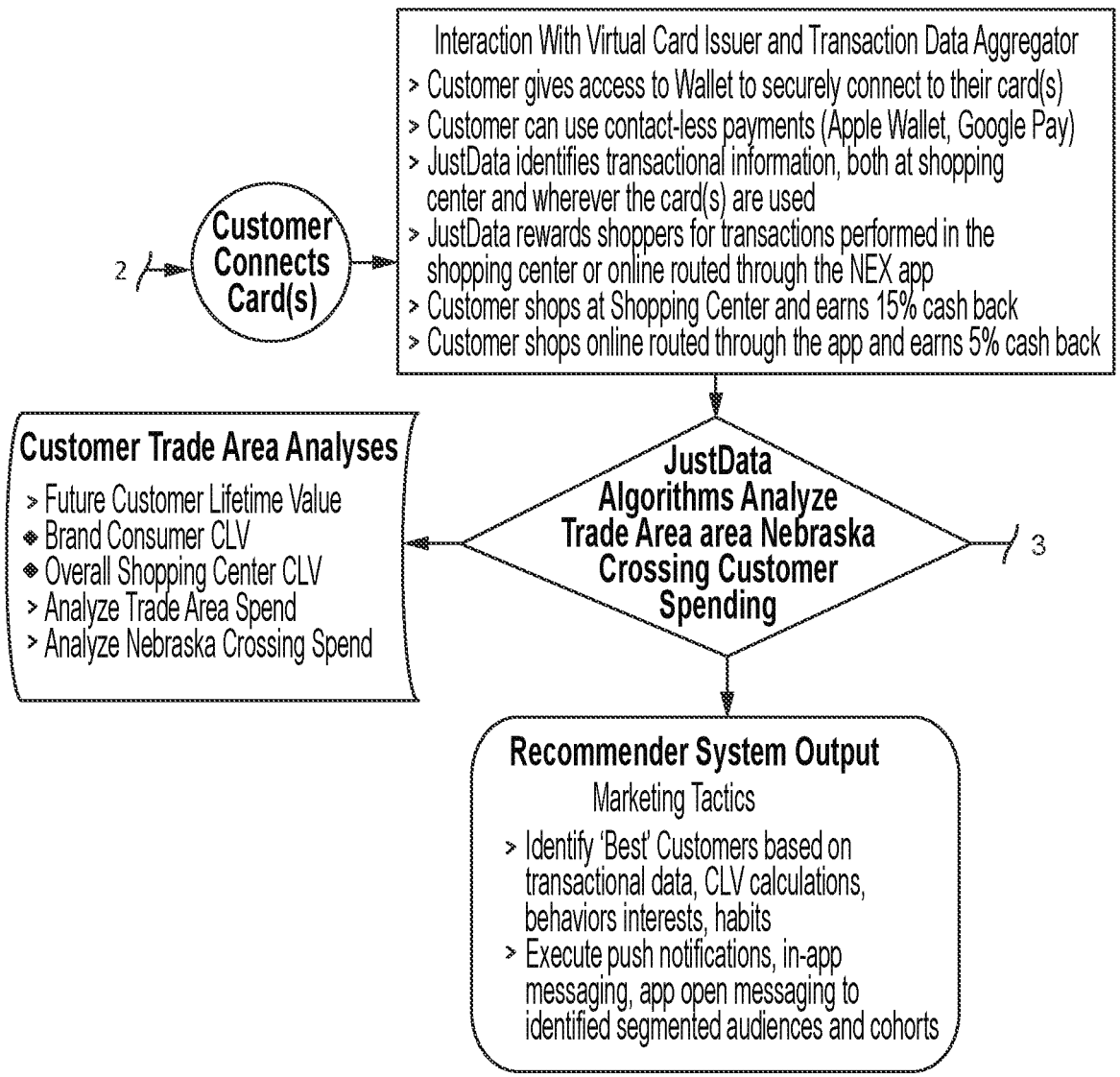
Figures 4, 10:

Referring now to FIG. 10, is a flowchart showing steps of data acquisition throughout the use of the systems and methods described herein with respect to a user application. The application first downloads an application (e.g., the NEX App). The app prompts the user to provide biographic/demographic information as part of onboarding the user. The user is then prompted to go through a rewards (FastCash) on-boarding process. This includes further illustrated steps such as providing matching algorithm data inputs and linking user/customer payment cards with the system 100. The matching algorithm, as previously described herein, collects information about the enrolled payment cardholder/user and uses that information to provide recommendations. The system 100 can also provide coupons and offers (e.g., based on matching algorithm results) to the enrolled payment cardholder. Once basic information (e.g., personal, demographic, and matching algorithm data) has been provided to the application, the application prompts the enrolled user to provide payment card information to begin earning rewards. If the enrolled customer declines to link a payment card, no rewards are earnable, but the application and system 100 can still track information about the user through the user's interaction with the application and/or physical store locations or equipment (e.g., quick reference codes, digital check-ins, or the like). This type of interaction can be tracked as previously described herein and/or using any other suitable techniques/systems.

When an enrolled user does elect to link a payment card, they are enrolled as previously described herein such that the system 100 can collect transaction information related to their purchases and provide rewards as described herein.

The data collection enables algorithmic and other data analytics. For example, data analytics can be performed as the data relates to customer trade area analyses. This includes predicting future customer lifetime value for specific enrolled payment cardholders, determining customer lifetime value of a specific enrolled payment cardholder for a specific brand/merchant within the trade are (e.g., geographic location in which rewards spend is restricted), determining aggregate customer lifetime value for all enrolled payment cardholders for a specific merchant/brand, determining aggregate customer lifetime value for all enrolled payment cardholders for the geographic area (e.g., shopping center) as a whole, determining or estimating the overall spend with a trade area in which the geographic area (e.g., shopping mall) is located, determining or estimating the overall spend by customers (or enrolled payment cardholders) at the geographic area, or the like.

The data collection also enables landlord trade area analyses. In this example, the landlord being the owner and lessor of, for example, a shopping mall or center. For example, these types of data analytics can include identifying merchant category voids (e.g., that a merchant for a particular type of product would do well in the shopping center), identifying brand opportunities (e.g., that a specific merchant would do well in the shopping center), determining individual or aggregate customer lifetime value as it pertains to the landlord (e.g., to make determination as to the effectiveness or desirability of landlord level offers, coupons, traffic drawing events, or the like), customer brand affinity, trade area and/or shopper demographics associated with the geographic location (e.g., shopping center), or the like.

The data analytics of this type can be used by the system 100 to provide outputs regarding marketing. For example, the system 100 can identify high customer lifetime value enrolled payment cardholders for targeted marketing, and identify enrolled payment cardholders with particular behaviors, interests, habits, demographics, etc. for targeted marketing efforts. The system 100 can also interact with the application running on the enrolled payment cardholder's device to push notifications including marketing materials to the user, provide in application messaging, and provided targeted messaging to certain cohorts of enrolled payment cardholders (e.g., the cohorts identified based on customer lifetime value, shared brand affinity, shared demographics, or the like).

Referring now to FIG. 11, an attribute database 1100 is shown according to one embodiment showing examples of information which can be included in such a database. The attribute data base can include information such as enrolled cardholder demographic information 1102, enrolled cardholder brand interest information 1104, enrolled cardholder behavior information 1106, and enrolled cardholder transaction information 1108. The attribute database 1100 includes such information for all or a cohort of enrolled payment cardholders sharing one or more attributes. Attribute entries are expressed numerically (e.g., using a scale, Boolean values, or the like) to enable analysis using collaborative filtering of the type described herein. In alternative embodiments, the entries may take other forms (e.g., a matrix of transaction data).

In the example attribute database shown in FIG. 11, the enrolled cardholder demographics 1102 include an age expressed in years and sex expressed as a Boolean value. Other demographic information of the type described herein can be included in the attribute database 1100. The enrolled cardholder brand interest information includes an interest rating between 1 and 5, five being the most interested. Such a rating can be acquired from the enrolled cardholder through the incentive application running on the enrolled cardholder's device using a survey or other techniques described herein. An interest or no interest identification (stored in the attribute database in Boolean form) can likewise be collected from enrolled payment cardholders using the incentive application. Brand interest is collected and stored in the attribute database for a plurality of brands (e.g., A, B, . . . , N) to enable recommendations of brands to some users based on shared similarities with other users who also shop with the brand to be recommended. These recommendations are generated using the collaborative filtering described in greater detail below. Other brand interest information can be included in the attribute database, FIG. 11 being an example of some information in some embodiments. The enrolled payment cardholder behavior information 1106 includes times spent of brand pages available through the incentive application. For example, the incentive management application can include for each brand a "page" that provides information about the brand, the brands products, store location, hours of operation, online ordering of products through the incentive application, and the like. The incentive application can track the amount of time such a page is open or active on the enrolled payment cardholder's device. This time is communicated to the incentive management system (e.g., using an appropriate digital message of the type described herein) and the incentive management system adds the information to the attribute database 1100. The transaction information 1108 stored in the attribute database 1100 can include information such as the number of transactions each enrolled payment cardholder has conducted with a particular merchant (e.g., brand). This information is parsed by the incentive management system (e.g., from the database of rewards eligible transactions) and is summed, calculated, or otherwise processed and added to the attributes database. Other transaction information can include, for example, a number of transactions within a specific time frame, average transaction amount, or the like. The transaction information 1108 can include transaction information for transactions between enrolled payment cardholders and non-enrolled merchants (e.g., be based on all transaction information received from the transaction aggregator rather than the database of rewards eligible transactions). Such transaction information can be used, for example, with the collaborative filtering to identify target merchants to invite to become enrolled merchants (e.g., merchants to invite to open a physical store within a shopping center). The invitation can be backed with data, from the collaborative filtering, that shows that a large number of current enrolled payment cardholders would likely be interested in the target brand as similar enrolled payment cardholders purchase the target merchant's products and make purchases from already enrolled merchants.

Referring specifically to the cardholder transaction information 1108, this information can be directly from a database of rewards eligible transactions of the type previously described with each entry enrolled cardholder entry in the attribute database being itself a matrix of the entries found within the database of rewards eligible transactions. In some embodiments, the attribute database can alternatively or additionally include transaction information that is determined using other databases of transaction information (e.g., the database of rewards eligible transactions). For example, the attribute database can include information calculated by querying the rewards eligible transactions database such as a number of transactions between the enrolled payment cardholder and a particular merchant/brand, the recency of a transaction between the enrolled payment cardholder and a particular merchant/brand, and the like.

Referring now to FIG. 12, a flowchart illustrates some steps in processing acquired data using a matching algorithm for the purposes of finding relationships and potential relationships between enrolled payment cardholders. The incentive management system acquires (1202) transaction data for enrolled payment cardholders through the incentive of provides rewards for transactions and providing access to the enrolled payment cardholder's transaction data. The transaction data is acquired using one or more of the techniques described throughout herein. The incentive management system also captures (1204) information regarding one or more enrolled cardholder demographics, enrolled cardholder brand interests, enrolled cardholder behavior, or enrolled cardholder transactions using an incentives application running on enrolled cardholder devices. As explained throughout herein, the incentives application runs on the enrolled payment cardholder's device and acquires information using interactable objects (fields, multiple choice radial buttons, drop down menus, and the like) and components of the device which the application interfaces (e.g., global positioning data from a GPS receiver, images from a camera sensor, and the like). The acquired information is transmitted to the incentive management system using techniques described herein (e.g., a digital message with information payload transmitted through the internet).

After acquiring transaction data and capturing information regarding the enrolled payment cardholders, the incentive management system establishes (1206) a cardholder attribute database based on the transaction data and enrolled cardholder information. The database is created and maintained using any suitable database technique of the type described herein. The database has a plurality of entries for a plurality of enrolled payment cardholders and includes a plurality of entries (e.g., the entries shown and described with respect to FIG. 11).

In some embodiments, the incentive management system then places (1208) the acquired transaction in one or more cohorts for analysis. For example, the cohort may be established as an attribute cohort (1210) based on one or more shared/overlapping attributes. For example, the cohort may be established to include all enrolled payment cardholders who are male. This allows further analysis of all male enrolled payment cardholders using other factors (e.g., interests in different brands). The cohort may be based on multiple attributes such as a rated interest in brand B of over 3 and being male. Any number of attributes can be used to establish the cohort. Alternatively, the cohort can be a merchant/brand cohort (1212). For example, the cohort can include all enrolled payment cardholders having at least one transaction with a particular brand/enrolled merchant (e.g., Brand A). In a further alternative, the cohort can be all enrolled payment cardholders (1214).

Instead of placing enrolled payment cardholders into cohorts based on attributes and/or transaction data, the incentive management system may use a multidimensional collaborative filter approach to determining relationships and potential relationships (e.g., recommendations) of the type described later herein.

The incentive management system applies (1216) a matching (e.g., recommendation) algorithm using two or more attributes within the established attribute database. The algorithm can be applied to a cohort or multiple cohorts serially. Alternatively, the algorithm can be applied to the entirety of the attribute database. As explained herein, the matching algorithm can be any suitable algorithm such as a collaborative filter of the memory-based type, model-based type, a hybrid type, a deep-learning type, context aware type, or the like. In one embodiment, the incentive management system applies a memory-based collaborative filter to the attribute database. A neighborhood-based collaborative filter or item-base/user-based top-N recommendation approach can be used. In a user based approach, with users being enrolled payment cardholders, and ratings being attributes, the value of ratings (attributes) user (enrolled payment cardholder) u gives to item i is calculated as an aggregation of some similar users' rating of the item:

$$r_{u,i} = \mathrm{aggr}_{u' \in U} r_{u',i}$$

where U denotes the set of top N users that are most similar to user u who rated item i. Some examples of the aggregation function include:

$$r_{u,i} = \frac{1}{N} \sum_{u' \in U} r_{u',i}$$

$$r_{u,i} = k \sum_{u' \in U} \mathrm{simil}(u, u') r_{u',i}$$

where k is a normalizing factor defined as:

$$k = 1 \Big/ \sum_{u' \in U} |\mathrm{simil}(u, u')|$$

$$r_{u,i} = \overline{r_u} + k \sum_{u' \in U} \mathrm{simil}(u, u')(r_{u',i} - \overline{r_{u'}})$$

where $\overline{r_u}$ is the average rating of user u for all the items rated by u. In the neighborhood-based approach, the algorithm calculates the similarity between two users or items, and produces a prediction for a particular user by talking the weighted average of all the ratings. Similarity can be determined using, for example, Pearson correlation and vector cosine approaches. The Pearson correlation similarity is determined between two user x and y defined as:

$$\mathrm{simil}(x, y) = \frac{\sum_{i \in I_{xy}} (r_{x,i} - \overline{r_x})(r_{y,i} - \overline{r_y})}{\sqrt{\sum_{i \in I_{xy}} (r_{x,i} - \overline{r_x})^2} \sqrt{\sum_{i \in I_{xy}} (r_{y,i} - \overline{r_y})^2}}$$

where $I_{xy}$ is the set of items rated by both user x and user y (e.g., in this case an attribute of the enrolled payment cardholder). The cosine-based approach determines cosine-similarity between two users x and y defined as:

$$\mathrm{simil}(x, y) = \cos(\vec{x}, \vec{y}) = \frac{\vec{x} \cdot \vec{y}}{\|\vec{x}\| \times \|\vec{y}\|} = \frac{\sum_{i \in I_{xy}} r_{x,i} r_{y,i}}{\sqrt{\sum_{i \in I_x} r_{x,i}^2} \sqrt{\sum_{i \in I_y} r_{y,i}^2}}$$

A user-based top-N recommendation/matching algorithm uses a similarly-based vector model to identify the most similar uses to an active user. Upon determining the most similar users, their corresponding user-attribute matrices are aggregated to identify the set of items to be recommended (e.g., using locality-sensitive hashing implementing the nearest neighbor mechanism in linear time). Any of these approaches or modified versions of these approaches may be used to determine the similarity between enrolled payment cardholders on one or more attributes for the purpose of predicting another attribute (e.g., likely interest in or satisfaction or transactions with a merchant). In alternative embodiments, other suitable matching/recommendation algorithms or approaches can be used.

Upon applying a matching algorithm to predict an attribute, the result(s) of the algorithm is output (1218). The output is based on a prediction made by applying the algorithm to the attribute database. The algorithm can be used to predict the likelihood that a particular enrolled payment cardholder is interested in a particular brand, will purchase from a specific brand, will purchase a particular product, etc. The algorithm can also be used to predict the likelihood and number of enrolled cardholders who would purchase from a brand that is not currently present within the geographic area (e.g., by identifying enrolled merchants that have purchased from a target brand not present in the geographic area and the number of other enrolled payment cardholders that are similar to said group). The data for inputs to such algorithms can be acquired by the incentive management system using the transaction data aggregator to collect transaction data that is not strictly limited to purchases between enrolled payment cardholders and enrolled merchants (e.g., as described earlier herein such as all transactions involving enrolled payment cardholders). Such outputs can be communicated to relevant parties. For example, upon determining that an enrolled payment cardholder(s) might be interested in a particular brand based on similarities to other uses, the incentive management system can, in some exemplary embodiments, transmit an instruction (e.g., through a digital message with an executable instruction payload) to the incentive application running on the enrolled payment cardholder(s) device(s) to display a push notification advertising products of the particular brand. The output can also include identifying potential enrolled payment cardholder targets for establishing a relationship with a merchant/brand (e.g., one not already enrolled). The output can identify a number of such enrolled payment cardholders and/or their identities. The output can also include information about the prediction such as the distance or likelihood of the enrolled payment cardholders (individual or in the aggregate) interest in such a merchant/brand. Such an output can be provided by the incentive management system through a web accessible portal or similar system.

Generally, the functions, systems, processes, and the like described herein are implemented using software and database structures and operations of the type generally known in the art running on computing equipment of the type generally known in the art. Databases of the type described herein can, for example, refer to either a body of data, a relational database management system (RDBMS), or to both. A database can, for example, include any collection of data including hierarchical databases, relational databases, flat file databases, object-relational databases, object oriented databases, and any other structured collection of records or data that is stored in a computer system. Examples of RDBMS's include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

With respect to the databases described herein, several database related operations are described such as querying databases, comparing entries between databases, adding entries to databases for established values, adding information to an existing database of a type not already recorded in the database, creating new databases, reading from databases, and the like. To carry out these functions any suitable database operators, instructions, requests, functions, programs, code, or the like known to one skilled in the art can be used. For example, databases can be operated using structured query language (SQL) and operations can be carried out using clauses (e.g., constituent components of statements and queries), expressions (e.g., commands to produce either scalar values, or tables consisting of columns and rows of data), predicates (e.g., that specify conditions that can be evaluated to SQL three-valued logic true/false/unknown or Boolean truth values and are used to limit the effects of statements and queries, or to change program flow), queries (e.g., that retrieve that data based on specific criteria), statements (e.g., that have a persistent effect on schemata and data, or can control transactions, program flow, connections, sessions, or diagnostics), or the like. In should be understood that regardless of the particular implementation of a database and the corresponding programming language, data can be written to, read from, manipulated, compared, or otherwise processed using known data processing techniques and associated known programming techniques.

As described herein, components of the system and/or other components communicate with one another through instructions, requests, or the like. It should be understood that instructions, requests, or the like as described herein are digital messages, communications, program instructions, or the like that communicate information using, for example, a digital message having a compatible format. The message can be formatted according to an application programming interface (API), standard, or the like. The instructions, requests, or the like are formatted such that they are processed by the receiving entity.

Processor of the type described herein can, for example, include any programmable system including systems using micro-controllers, reduced instruction set circuits (RISC), application specific integrated circuits (ASICs), logic circuits, and any other circuit or processor capable of executing the functions described herein.

The functions and systems described herein are implemented using, in part, software, firmware, programs, functions, or the like as described herein. These data processing systems and techniques can, for example, include any computer program stored in memory for execution by a processor, including RAM memory, ROM memory, EPROM memory, EEPROM memory, and non-volatile RAM (NV RAM) memory.

In some embodiments, a computer program is provided which performs some or all of the functions described herein with respect to individual components of the system, and the program can be embodied on a computer readable medium. In some embodiments, portions of the system and portions of the associated functions are executed on a single computer system, without requiring a connection to a sever computer. In some embodiments, all or portions of the systems and/or components described herein are being run in a Windows® environment (Windows is a registered trademark of Microsoft Corporation, Redmond, Wash.). In yet another embodiment, all or portions of the systems and/or components described herein are run on a mainframe environment and a UNIX® server environment (UNIX is a registered trademark of X/Open Company Limited located in Reading, Berkshire, United Kingdom). Applications of the type described herein should be understood to be flexible and designed to run in various different environments without compromising any major functionality. In some embodiments, the system includes multiple components distributed among a plurality of computing devices. One or more components can be in the form of computer-executable instructions embodied in a computer-readable medium. The systems and processes are not limited to the specific embodiments described herein. The descriptions provided herein illustrate at least one example of carrying out the described functions. In addition, components of each system and each process can be practiced independent and separate from other components and processes described herein. Each component and process can also be used in combination with other assembly packages and processes.

Changes can be made in the above constructions without departing from the scope of the disclosure. It is intended that all matter contained in the above description or shown in the accompanying drawings shall be interpreted as illustrative and not in a limiting sense.

I claim:

1. A method for determining customer preference and to provide for geographically limited rewards earned for transactions using an incentive system, the method comprising:
    tracking payment card transactions between enrolled payment cardholders and enrolled merchants by collecting, at the incentive management system, transaction data identified by a transaction data aggregator and transmitted to the incentive management system transaction data that includes an identifier of an enrolled payment cardholder, wherein the transaction data aggregator is in communication with a payment network adapted and configured to settle payment card transactions;
    based on the tracked payment card transactions creating, using the incentive management system, a database of rewards eligible transactions by cross referencing the tracked payment card transactions with a database of enrolled merchants to identify those transactions occurring between enrolled payment cardholders and enrolled merchants, placing those identified transactions into the database of rewards eligible transactions;
    for each rewards eligible transaction of the database of rewards eligible transactions applying a rewards factor to calculate a rewards amount;
    instructing, using the incentive management system, a virtual payment card issuer to apply the rewards amount for each rewards eligible transaction to an account associated with the corresponding enrolled payment cardholder;
    receiving, at the incentive management system, transaction authorization requests from the virtual payment card issuer corresponding to enrolled cardholders requesting to spend rewards within their corresponding account;
    determining, at and using the incentive management system, if the transaction of the transaction authorization request occurred within a prescribed geographic area in which rewards can be spent at enrolled merchants;
    in response to determining that the transaction is occurring within the prescribed geographic area in which rewards can be spent, transmitting from the incentive management system and to the virtual payment card issuer, an authorization for the virtual card issuer to complete the transaction using the rewards;
    capturing, using an incentive application running on an enrolled payment cardholder device, enrolled cardholder information including one or more of enrolled payment cardholder demographic information, enrolled payment cardholder brand interest information, or enrolled payment cardholder behavior information, the incentive application being adapted and configured to communicate the enrolled cardholder information to the incentive management system such that the incentive management system receives the cardholder information;
    establishing, using the incentive management system, an enrolled payment cardholder attribute database based on the collect transaction information associated with enrolled payment cardholders, the cardholder attribute database including entries for at least two enrolled payment cardholders, each entry including at least one element that numerically expresses enrolled cardholder information, and each entry including at least one element that numerically expresses collected transaction information pertaining to the enrolled payment cardholder;
    applying, using the incentive management system, a matching algorithm to the enrolled payment cardholder attribute database to generate a prediction of one attribute of a first enrolled payment cardholder based on similarity between one or more attributes with one or more other enrolled payment cardholders; and
    outputting, using the incentive management system, a result from the application of the matching algorithm to the enrolled payment cardholder database.

2. A method in accordance with claim 1, wherein applying a matching algorithm comprises applying a collaborative filter algorithm to the enrolled payment cardholder attribute.

3. A method in accordance with claim 2, wherein the collaborative filer algorithm is one or more of a memory-based collaborative filter algorithm, a model-based collaborative filter algorithm, a hybrid collaborative filter algorithm, a deep-learning collaborative filter algorithm, or a context aware collaborative filter algorithm.

4. A method in accordance with claim 1, wherein the collaborative filter algorithm is a memory-based collaborative filter using a user based approach.

5. A method in accordance with claim 1, wherein the collaborative filter algorithm is a memory-based collaborative filter using a neighborhood-based approach to calculate similarity between two enrolled payment cardholders.

6. A method in accordance with claim 5, wherein similarity is calculated using a Pearson correlation approach or a vector cosine approach.

7. A method in accordance with claim 1, further comprising placing the enrolled payment cardholders and associated entries within the enrolled payment cardholder attribute database into one or more cohorts, and wherein applying a matching algorithm to the enrolled payment cardholder attribute database comprises applying the matching algorithm to one or more of the cohorts.

8. A method in accordance with claim 1, wherein a cohort includes all enrolled payment cardholders having one or more shared attributes, includes all enrolled payment cardholders having one or more attributes with overlapping values, or includes all enrolled payment cardholders having at least one transaction with a predefined merchant.

9. A method in accordance with claim 1, wherein outputting a result from the application of the matching algorithm to the enrolled payment cardholder database comprises transmitting, from the incentive management system and to the incentive application running on an enrolled payment cardholder device, an instruction to cause the incentive application to present a push notification recommending an enrolled merchant to the enrolled payment cardholder.

10. A method in accordance with claim 1, wherein the enrolled payment cardholder attribute database includes attribute entries expressed in one or more of Boolean values, numerical scale values, or absolute numerical value.

11. A method in accordance with claim 1, wherein enrolled payment cardholder demographic information includes one or more of age or sex expressed as a Boolean value; wherein enrolled payment cardholder brand interest information includes one or more of a first brand expression of interest expressed as a Boolean value, a second brand expression of interest expressed as a Boolean value, a first brand expression of interest expressed as a ratings scale value, or a second brand expression of interest expressed as a ratings scale value; and wherein enrolled payment cardholder behavior information includes an amount of time spent on a first brand's page presentable by the incentive application and measured by the incentive application; an amount of time spent on a second brand's page presentable by the incentive application and measured by the incentive application; an indication if the enrolled payment cardholder visited a physical location of a first merchant as measured by the incentive application and expressed as a Boolean value, or an indication if the enrolled payment cardholder visited a physical location of a second merchant as measured by the incentive application and expressed as a Boolean value.

12. A method for determining customer preference and to provide for geographically limited rewards earned for transactions using an incentive system, the method comprising:

incentivizing repeat transactions between payment cardholders and merchants within a prescribed geographic area comprising:

acquiring, in response to a data request, a first set of transaction data from a payment network at and using a transaction data aggregator, the payment network comprising a server adapted and configured to communicate with merchant banks and payment card issuing banks to settle transactions between payment cardholders and merchants;

creating, at and using the incentive management system, a database of a second set of transaction data, the second set of transaction data being a subset of the first set of transaction data, the database of the second set of transaction data created by at least (1) comparing the first set of transaction data to a database of enrolled payment cardholder identification data and selecting those transactions in the first set of transaction data that include identification information associated with enrolled payment cardholders and stored in the database of enrolled payment cardholder identification data or (2) comparing the first set of transaction data to a database of enrolled merchant identification data and selecting those transactions in the first set of transaction data that include identification information associated with enrolled merchants and stored in the database of enrolled merchant identification data, wherein the selected transactions are entered into the database of the second set of transaction data;

identifying, at and using the incentive management system, rewards eligible transactions and creating a database of rewards eligible transactions by at least (1) comparing the database of the second set of transaction data, when said database includes transactions selected as including identification information associated with enrolled payment cardholders, to a database of enrolled merchant identification data and selecting those transactions that include identification data matching identification data within the database of enrolled merchant identification data or (2) comparing the database of the second set of transaction data, when said database includes transaction selected as including identification information associated with enrolled merchants, to a database of enrolled payment cardholders and selecting those transactions that include identification data matching identification data within the database of enrolled payment cardholders identification data;

calculating rewards, at and using the incentive management system, by querying the database of rewards eligible transactions to determine, for each transaction, a dollar amount of the transaction, multiplying the dollar amount by a rewards factor to calculate a rewards amount for each rewards eligible transaction within the database of rewards eligible transactions;

transmitting, from the incentive management system and for each transaction within the database of rewards eligible transactions, an instruction to a virtual card issuer to apply the rewards amount to an account corresponding to the cardholder identification data associated with the eligible transaction within the database of rewards eligible transactions, the instruction including the rewards amount and a cardholder identification, the account being tied to a virtual payment card issued by the virtual card issuer;

receiving, at and using the incentive management system and from the virtual card issuer, a transaction authorization request associated with a transaction initiated by an enrolled payment cardholder to make a purchase using rewards, the transaction authorization request including transaction data including at least enrolled payment cardholder identification information and merchant identification information;

determining, at and using the incentive management system, if the transaction of the transaction authorization request occurred within a prescribed geographic area in which rewards can be spent at enrolled merchants; and in response to determining that the transaction is occurring within the prescribed geographic area in which rewards can be spent, transmitting from the incentive management system and to the virtual card issuer, an authorization for the virtual card issuer to complete the transaction using the rewards;

capturing, using an incentive application running on an enrolled payment cardholder device, enrolled cardholder information including one or more of enrolled payment cardholder demographic information, enrolled payment cardholder brand interest information, or enrolled payment cardholder behavior information, the incentive application being adapted and configured to communicate the enrolled cardholder information to the incentive management system such that the incentive management system receives the cardholder information;

establishing, using the incentive management system, an enrolled payment cardholder attribute database based on the collect transaction information associated with enrolled payment cardholders, the cardholder attribute database including entries for at least two enrolled payment cardholders, each entry including at least one element that numerically expresses enrolled cardholder information, and each entry including at least one element that numerically expresses collected transaction information pertaining to the enrolled payment cardholder;

applying, using the incentive management system, a matching algorithm to the enrolled payment cardholder attribute database to generate a prediction of one attribute of a first enrolled payment cardholder based on similarity between one or more attributes with one or more other enrolled payment cardholders; and outputting, using the incentive management system, a result from the application of the matching algorithm to the enrolled payment cardholder database.

13. A method in accordance with claim 12, wherein applying a matching algorithm comprises applying a collaborative filter algorithm to the enrolled payment cardholder attribute.

14. A method in accordance with claim 13, wherein the collaborative filer algorithm is one or more of a memory-based collaborative filter algorithm, a model-based collaborative filter algorithm, a hybrid collaborative filter algorithm, a deep-learning collaborative filter algorithm, or a context aware collaborative filter algorithm.

15. A method in accordance with claim 12, wherein similarity is calculated using a Pearson correlation approach or a vector cosine approach.

16. A method in accordance with claim 12, wherein outputting a result from the application of the matching algorithm to the enrolled payment cardholder database comprises transmitting, from the incentive management system and to the incentive application running on an enrolled payment cardholder device, an instruction to cause the incentive application to present a push notification recommending an enrolled merchant to the enrolled payment cardholder.

17. A method in accordance with claim 12, wherein enrolled payment cardholder demographic information includes one or more of age or sex expressed as a Boolean value; wherein enrolled payment cardholder brand interest information includes one or more of a first brand expression of interest expressed as a Boolean value, a second brand expression of interest expressed as a Boolean value, a first brand expression of interest expressed as a ratings scale value, or a second brand expression of interest expressed as a ratings scale value; and wherein enrolled payment cardholder behavior information includes an amount of time spent on a first brand's page presentable by the incentive application and measured by the incentive application; an amount of time spent on a second brand's page presentable by the incentive application and measured by the incentive application; an indication if the enrolled payment cardholder visited a physical location of a first merchant as measured by the incentive application and expressed as a Boolean value, or an indication if the enrolled payment cardholder visited a physical location of a second merchant as measured by the incentive application and expressed as a Boolean value.

18. A method in accordance with claim 12, wherein determining if the transaction is occurring within the prescribed geographic area in which rewards can be spent comprises determining if a merchant identification included in the transaction authorization request matches a merchant identification held within the database of enrolled merchant identification data by querying the database of enrolled merchant identification data with the merchant identification included in the transaction authorization request, and wherein the incentive management system determines that the transaction is occurring within the prescribed geographic area in response to a match being found between the merchant identification included in the transaction authorization request and a merchant identification stored within the database of enrolled merchant identification data.

19. A method in accordance with claim 12, wherein determining if the transaction is occurring within the prescribed geographic area in which rewards can be spent comprises comparing a portion of a merchant address included within the transaction authorization request to a portion of an address defining the geographic area within which rewards can be spent, the portion of the address defining the geographic area being predefined and stored within the incentive management system.

20. A method in accordance with claim 12, wherein determining if the transaction is occurring within the prescribed geographic area in which rewards can be spent comprises:

in response to receiving the transaction authorization request, transmitting, from the incentive management system, a request to an enrolled payment cardholder device for global positioning system data, the request adapted and configured to cause an application running on the enrolled payment cardholder device to retrieve global positioning system data and transmit the global positioning system data to the incentive management system;

receiving, from the enrolled payment cardholder device and at the incentive management system, global positioning system data and associating that global positioning system data with the transaction authorization request;

comparing the global positioning system data associated with the transaction authorization request to a geofence boundary defining the prescribed geographic area in which rewards can be spent at enrolled merchants; and determining that the transaction of the transaction authorization request occurred within the prescribed geographic area when the global positioning system data associated with the transaction authorization request corresponds to a location within the geofence boundary.

\* \* \* \* \*